US012586457B2

(12) United States Patent (10) Patent No.: US 12,586,457 B2
Dong et al. (45) Date of Patent: Mar. 24, 2026

(54) HOME DEVICE POSITION MARKING METHOD AND ELECTRONIC DEVICE

(71) Applicant: Huawei Technologies Co., Ltd., Shenzhen (CN)

(72) Inventors: Wei Dong, Xi'an (CN); Haowei Xu, Xi'an (CN); Qingfeng Xue, Xi'an (CN); Erli Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/263,623

(22) PCT Filed: Dec. 23, 2021

(86) PCT No.: PCT/CN2021/140930
§ 371 (c)(1),
(2) Date: Jul. 31, 2023

(87) PCT Pub. No.: WO2022/161054
PCT Pub. Date: Aug. 4, 2022

(65) Prior Publication Data
US 2024/0153375 A1 May 9, 2024

(30) Foreign Application Priority Data

Jan. 30, 2021 (CN) .......................... 202110131728.8

(51) Int. Cl.
*G06F 3/0484* (2022.01)
*G08C 17/02* (2006.01)
*H04L 12/28* (2006.01)

(52) U.S. Cl.
CPC ........... *G08C 17/02* (2013.01); *G06F 3/0484* (2013.01); *H04L 12/282* (2013.01); *G08C 2201/32* (2013.01); *H04L 2012/2841* (2013.01)

(58) Field of Classification Search
CPC .... G06F 3/0484; G06F 1/1694; G06F 1/1698; G06F 3/04817; H04L 12/282; G08C 2201/32; H04M 1/72415; H04S 7/302
See application file for complete search history.

(56) References Cited

U.S. PATENT DOCUMENTS

2013/0113993 A1* 5/2013 Dagit, III ......... H04N 21/41265
348/734
2017/0104932 A1 4/2017 Jiang et al.
(Continued)

FOREIGN PATENT DOCUMENTS

CN 106548620 A 3/2017
CN 106789461 A 5/2017
(Continued)

*Primary Examiner* — Phuong H Nguyen
(74) *Attorney, Agent, or Firm* — Conley Rose, P.C.

(57) ABSTRACT

A method is implemented by an electronic device to mark a position of a home device. The method includes that the electronic device receives a first operation of a user, where the first operation is used to trigger the electronic device to mark a position of a first home device in a plurality of home devices. In response to the first operation, the electronic device obtains, by using a UWB chip, spatial position-attitude information of the electronic device when the electronic device separately points to the first home device in n orientations, and calculates spatial position information of the first home device based on the spatial position-attitude information of the electronic device in the n orientations.

20 Claims, 27 Drawing Sheets

(56)         References Cited

U.S. PATENT DOCUMENTS

2018/0206083 A1*   7/2018   Kumar ................... H04W 4/30
2020/0204673 A1*   6/2020   Barathan ................ H04W 4/70
2022/0006892 A1*   1/2022   Perkins ................... H01R 4/28

FOREIGN PATENT DOCUMENTS

CN          107067695 A      8/2017
CN          107179080 A      9/2017
CN          108919663 A     11/2018
CN          110007615 A      7/2019
CN          110568767 A     12/2019
CN          111142396 A      5/2020
CN          111521969 A      8/2020
CN          111830455 A     10/2020
CN          114355785 A      4/2022

* cited by examiner

XOY-equivalent to a horizontal plane     $\varphi$ : Pitch angle
$Oy_B{}'$ is a vertical projection of the     $\phi$ : Yaw angle
$y_B$ axis on the XOY plane $y_B OZ$-equivalent to a vertical plane        $\theta$: Roll angle $Oz_B'$ is a vertical projection of the $z_B$ axis on the $y_B OZ$ plane (First operation)

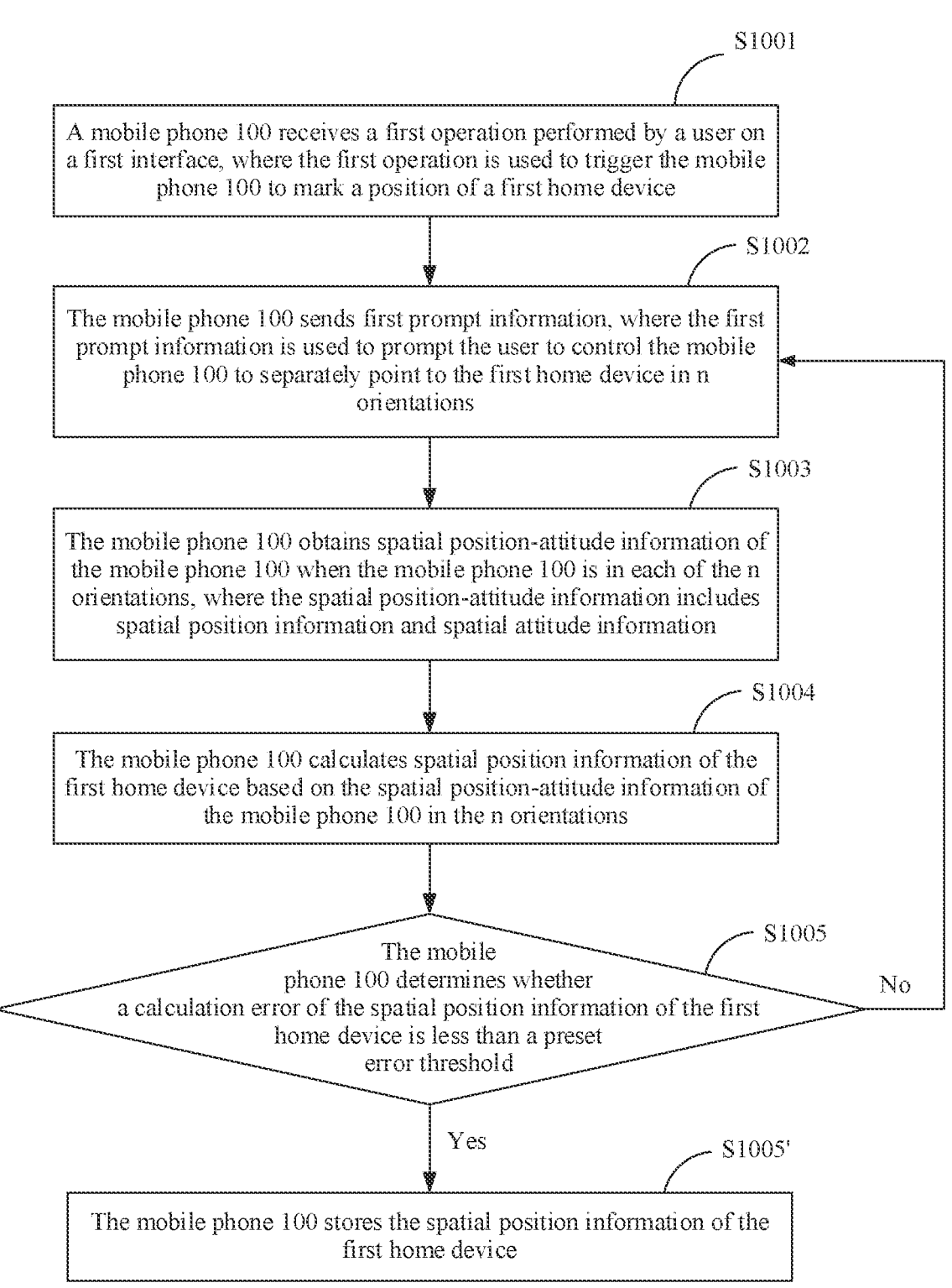

S1001

A mobile phone 100 receives a first operation performed by a user on a first interface, where the first operation is used to trigger the mobile phone 100 to mark a position of a first home device

S1002

The mobile phone 100 sends first prompt information, where the first prompt information is used to prompt the user to control the mobile phone 100 to separately point to the first home device in n orientations

S1003

The mobile phone 100 obtains spatial position-attitude information of the mobile phone 100 when the mobile phone 100 is in each of the n orientations, where the spatial position-attitude information includes spatial position information and spatial attitude information

S1004

The mobile phone 100 calculates spatial position information of the first home device based on the spatial position-attitude information of the mobile phone 100 in the n orientations

S1005

The mobile phone 100 determines whether a calculation error of the spatial position information of the first home device is less than a preset error threshold No Yes

S1005'

The mobile phone 100 stores the spatial position information of the first home device

FIG. 22

HOME DEVICE POSITION MARKING METHOD AND ELECTRONIC DEVICE

CROSS-REFERENCE TO RELATED APPLICATIONS

This is a U.S. National Stage of International Patent Application No. PCT/CN2021/140930 filed on Dec. 23, 2021, which claims priority to Chinese Patent Application No. 202110131728.8 filed on Jan. 30, 2021. Both of the aforementioned applications are hereby incorporated by reference in their entireties.

TECHNICAL FIELD

Embodiments of this application relate to the smart home field, and in particular, to a home device position marking method and an electronic device.

BACKGROUND

With development of science and technology, smart home devices gradually enter people's daily life. A smart home may use a house as a platform to integrate home devices (such as a smart television and a smart air conditioner) related to home life for controlling over a wireless local area network such as a wireless fidelity (Wireless Fidelity. Wi-Fi) network, to improve home security, convenience, and comfort.

Specifically, a user may install a smart home application (Application, APP) on an electronic device (for example, a mobile phone or a tablet computer), to control a plurality of home devices. For example, the mobile phone may display a control interface of any home device (for example, a smart television, a smart air conditioner, or a smart socket) in the smart home app in response to an operation performed by the user on an identifier of the home device. Then, the mobile phone may control the home device in response to an operation performed by the user on the control interface displayed by the mobile phone.

However, because there are more home devices, a quantity of home devices that can be controlled by the smart home app accordingly increases. To more conveniently control the home devices, currently, a function of displaying a control interface of a home device when the mobile phone points to the home device may be implemented by using an ultra-wideband (ultra-wideband, UWB) chip and an inertial measurement unit (inertial measurement unit, IMU) on the mobile phone.

Before the function is implemented, the mobile phone needs to mark a position of each home device (that is, obtain a spatial position of each home device). However, an existing marking method is not applicable to all home devices. For example, the mobile phone cannot mark a position of a home device that is not configured with the UWB chip.

SUMMARY

This application provides a home device position marking method and an electronic device. Even if no UWB chip is configured for the home device, the electronic device may mark a position of the home device. In addition, accuracy of marking the position of the home device by the electronic device can be further improved, thereby improving positioning accuracy when the electronic device directionally controls the home device.

According to a first aspect, this application provides a home device position marking method. The method may be applied to an electronic device, and the electronic device includes a UWB chip. The electronic device may receive a first operation of a user, where the first operation is used to trigger the electronic device to mark a position of a first home device in a plurality of home devices. In response to the first operation, the electronic device may obtain, by using the UWB chip, spatial position-attitude information of the electronic device when the electronic device separately points to the first home device in n orientations, where the spatial position-attitude information of the electronic device may include spatial position information and spatial attitude information. Finally, the electronic device may calculate spatial position information of the first home device based on the spatial position-attitude information of the electronic device in the n orientations, where n≥2, and n is an integer.

In this application, an electronic device 100 on which a UWB apparatus and an IMU apparatus are configured may be operated, to separately point to a home device in a plurality of positions, so that the electronic device 100 marks a position of the home device. According to the method in this embodiment of this application, even if no UWB apparatus is configured for the home device, the electronic device 100 may still mark the position of the home device.

In addition, when the method in this application is used to mark the position of the home device, accuracy of position marking is not affected by signal strength of a UWB base station. In other words, according to this solution, accuracy of marking the position of the home device by the electronic device can be further improved, thereby improving positioning accuracy when the electronic device directionally controls the home device.

In a possible design of the first aspect, that the electronic device receives a first operation of a user may include: The electronic device receives the first operation of the user on a first interface.

In an implementation, the first interface is a device management interface of a smart home application (Application, APP) of the electronic device, and the device management interface includes icons of the plurality of home devices bound to the smart home app. The first operation is a preset operation performed on the first home device in the plurality of home devices.

In another implementation, the first interface is a control interface of the first home device in the plurality of home devices bound to the smart home app of the electronic device, the control interface of the first home device includes a preset function item, the preset function item is used to trigger the electronic device to mark the position of the first home device, and the first operation is a tap operation performed on the preset function item.

In another possible design of the first aspect, in response to the first operation, the electronic device may send first prompt information, to prompt the user to control the electronic device to point to the first home device in the n orientations, where n≥2, and n is an integer.

In another possible design of the first aspect, the first prompt information is further used to prompt the user to control the electronic device to maintain preset duration in each orientation when the electronic device points to the first home device in the n orientations.

It should be understood that it takes time for the electronic device to obtain spatial position-attitude information of the electronic device when the electronic device points to the first home device in each orientation. When the electronic device points to the first home device in the n orientations, the electronic device maintains the preset duration in each orientation. This helps improve a possibility that the electronic device successfully obtains the spatial position-attitude information.

In another possible design of the first aspect, the first prompt information is further used to prompt the user of a manner of controlling the electronic device to separately point to the first home device in the n orientations, and the manner includes a text manner or an image manner.

It should be understood that the user may not know how to control the electronic device to separately point to the first home device in the n orientations. The first prompt information may prompt, in the text or image manner, the user to control the electronic device to separately point to the first electronic device in the n orientations. This helps the user to control, in a manner prompted by the first prompt information, the electronic device to control, in a correct manner, the electronic device to separately point to the first home device in the n orientations.

In another possible design of the first aspect, after the electronic device sends the first prompt information in response to the first operation, the method in this embodiment of this application may further include. After obtaining spatial position-attitude information of the electronic device in an orientation k in the n orientations, the electronic device sends second prompt information, where the second prompt information is used to prompt the user to control the electronic device to move from the orientation k to an orientation k+1 and point to the first home device in the orientation k+1, and k has a value in $\{1, 2, \ldots, n-1\}$ successively.

In this application, after obtaining spatial position-attitude information of the electronic device in an orientation, the electronic device may send the second prompt information, to prompt the user to update an orientation of the electronic device and point to the first home device in the new orientation. In this way, use experience of the user in a process of controlling the electronic device to mark the position of the home device can be improved.

In another possible design of the first aspect, after the electronic device calculates the spatial position information of the first home device based on the spatial position-attitude information of the electronic device in the n orientations, the method in this embodiment of this application may further include: The electronic device sends third prompt information, where the third prompt information is used to prompt the user that position marking of the first home device is completed, and prompt the user that the electronic device can be operated to directionally control the first home device.

In another possible design of the first aspect, that the electronic device obtains, by using the UWB chip, the spatial position-attitude information of the electronic device when the electronic device separately points to the first home device in the n orientations may include: In response to a second operation, the electronic device obtains spatial position-attitude information i of the electronic device when the electronic device points to the first home device in an orientation i in the n orientations, where i has a value in $\{1, 2 \ldots, n\}$ successively.

The second operation is a tap operation performed on a preset button in the electronic device or a preset control in the first prompt information when the user controls the electronic device to point to the first home device in the orientation i, the preset button is used to trigger the electronic device to obtain the spatial position-attitude information of the electronic device, and the preset control is used to trigger the electronic device to obtain the spatial position-attitude information of the electronic device.

In this design, when the user controls the home device to point to the first home device in the orientation i, the user may input the second operation to the electronic device. In response to the second operation, the electronic device may obtain the spatial position-attitude information i of the electronic device when pointing to the first home device in the orientation i. In this way, through control of the user, the electronic device may obtain the accurate spatial position-attitude information i when the electronic device points to the first home device in the orientation i.

In another possible design of the first aspect, the electronic device further includes an inertial measurement unit (inertial measurement unit, IMU) chip. That the electronic device obtains, by using the UWB chip, the spatial position-attitude information of the electronic device when the electronic device separately points to the first home device in the n orientations may include: When pointing to the first home device in the orientation i in the n orientations, the electronic device interacts with m UWB base stations by using the UWB chip, to obtain a distance between the electronic device and each of the m UWB base stations, and calculates spatial position information i of the electronic device based on the obtained distance; and the electronic device obtains, by using the UWB chip and the IMU chip, spatial attitude information i of the electronic device when the electronic device points to the first home device in the orientation i, where i has a value in $\{1, 2, \ldots, n\}$ successively, $m \geq 3$, m is an integer, and the m UWB base stations are provided by at least one home device including a UWB chip.

For example, the m UWB base stations each may broadcast a first message. When pointing to the first home device in the orientation i, the electronic device may receive the first message from each UWB base station. The electronic device may obtain, through calculation, the distance between the electronic device and each UWB base station based on the received first message.

Alternatively, the electronic device may send a distance measurement request to the UWB base station when pointing to the first home device in the orientation i. After receiving the distance measurement request, the UWB base station sends a distance measurement response to the electronic device. The electronic device may obtain, through calculation, the distance between the electronic device and each UWB base station based on the received distance measurement response.

In another possible design of the first aspect, the spatial position-attitude information of the electronic device in the orientation i in the n orientations includes the spatial position information i of the electronic device in the orientation i and the spatial attitude information i of the electronic device in the orientation i, where i has a value in $\{1, 2, \ldots, n\}$ successively.

The spatial position information ii of the electronic device in the orientation i is coordinates $(x_i, y_i, z_i)$ of the electronic device in a UWB coordinate system constructed by using the m UWB base stations when the electronic device points to the first home device in the orientation i. The m UWB base stations are provided by the at least one home device including a UWB chip.

The spatial attitude information i of the electronic device in the orientation i includes a pitch angle $\varphi_i$, a yaw angle $\phi_i$, and a roll angle $\theta_i$ of a carrier coordinate system of the electronic device relative to the UWB coordinate system when the electronic device points to the first home device in the orientation i, and the carrier coordinate system is pre-configured in the electronic device.

The spatial position information of the first home device is coordinates (x, y, z) of the first home device in the UWB coordinate system.

In another possible design of the first aspect, a method for calculating, by the electronic device, the spatial position information of the first home device based on the spatial position-attitude information of the electronic device in the n orientations may include: The electronic device calculates the spatial position information (x, y, z) of the first home device by using a preset rotation matrix based on the coordinates $(x_i, y_i, z_i)$ of the electronic device in the UWB coordinate system, the pitch angle $\varphi_i$, the yaw angle $\phi_i$ and the roll angle $\theta_i$ that are obtained when the electronic device points to the first home device in the n orientations.

The preset rotation matrix is a rotation matrix obtained when the electronic device transforms from a spatial attitude corresponding to the pitch angle $\varphi_i$, the yaw angle $\phi_i$, and the roll angle $\theta_i$ to a preset initial attitude: the preset initial attitude is an attitude of the electronic device that exists when three axes of the carrier coordinate system are respectively parallel to three axes of the UWB coordinate system; and the preset rotation matrix is used to convert a coordinate parameter in the carrier coordinate system into a coordinate parameter in the UWB coordinate system.

In another possible design of the first aspect, the method further includes: The electronic device determines whether a calculation error of the spatial position information of the first home device is less than a preset error threshold; and if the calculation error of the spatial position information of the first home device is less than the preset error threshold, the electronic device stores the spatial position information of the first home device.

A smaller calculation error of the spatial position information of the first home device indicates higher calculation precision of the spatial position information, and higher accuracy of performing directional control on the first home device based on the spatial position information. However, a larger calculation error of the spatial position information indicates lower calculation precision of the spatial position information, and lower accuracy of performing directional control on the first home device based on the spatial position information. In this application, the spatial position information of the first home device is stored only when the calculation error of the spatial position information of the first home device is less than the preset error threshold, so as to directionally control the first home device. In this way, accuracy of performing directional control on the first home device may be improved.

In another possible design of the first aspect, the method further includes: If the calculation error of the spatial position information of the first home device is less than the preset error threshold, the electronic device sends the third prompt information, where the third prompt information is used to prompt the user that position marking of the first home device is completed, and prompt the user that the electronic device can be operated to directionally control the first home device.

In another possible design of the first aspect, the method further includes: If the calculation error of the spatial position information of the first home device is greater than or equal to the preset error threshold, the electronic device sends fourth prompt information. The fourth prompt information is used to request the user to determine whether to re-mark the position of the first home device.

If the calculation error of the spatial position information of the first home device is greater than or equal to the preset error threshold, it indicates that the calculation precision of the spatial position information does not meet a precision requirement. In this case, the electronic device may interact with the user by using the fourth prompt information, and request the user to determine whether to re-mark the position of the first home device. In this way, the electronic device may re-mark the position of the first home device based on an intention of the user, or give up performing position marking on the first home device.

According to a second aspect, this application provides an electronic device. The electronic device includes a UWB chip, a display, a memory, and one or more processors. The UWB chip, the display, and the memory are coupled to the processor. The memory is configured to store computer program code. The computer program code includes computer instructions. When the computer instructions are executed by the electronic device, the electronic device is enabled to perform the following steps: receiving a first operation of a user, where the first operation is used to trigger the electronic device to mark a position of a first home device in a plurality of home devices; in response to the first operation, obtaining, by using a UWB chip, spatial position-attitude information of the electronic device when the electronic device separately points to the first home device in n orientations, where the spatial position-attitude information includes spatial position information and spatial attitude information; and calculating spatial position information of the first home device based on the spatial position-attitude information of the electronic device in the n orientations, where n≥2, and n is an integer.

In a possible design of the second aspect, when the computer instructions are executed by the electronic device, the electronic device is enabled to further perform the following step: receiving the first operation of the user on a first interface.

The first interface is a device management interface of a smart home application app of the electronic device, the device management interface includes icons of the plurality of home devices bound to the smart home app, and the first operation is a preset operation performed on the first home device in the plurality of home devices.

Alternatively, the first interface is a control interface of the first home device bound to the smart home app of the electronic device, the control interface of the first home device includes a preset function item, the preset function item is used to trigger the electronic device to mark the position of the first home device in the plurality of home devices, and the first operation is a tap operation performed on the preset function item.

In another possible design of the second aspect, the method further includes: The electronic device sends first prompt information in response to the first operation. The first prompt information is used to prompt the user to control the electronic device to point to the first home device in the n orientations.

In another possible design of the second aspect, the first prompt information is further used to prompt the user to control the electronic device to maintain preset duration in each orientation when the electronic device points to the first home device in the n orientations.

In another possible design of the second aspect, the first prompt information is further used to prompt the user of a manner of controlling the electronic device to separately point to the first home device in the n orientations, and the manner includes a text manner or an image manner.

In another possible design of the second aspect, when the computer instructions are executed by the electronic device, the electronic device is enabled to further perform the following steps: after obtaining spatial position-attitude information of the electronic device in an orientation k in the n orientations, sending second prompt information, where the second prompt information is used to prompt the user to control the electronic device to move from the orientation k to an orientation k+1 and point to the first home device in the orientation k+1, and k has a value in $\{1, 2, \ldots, n-1\}$ successively.

In another possible design of the second aspect, when the computer instructions are executed by the electronic device, the electronic device is enabled to further perform the following step: after calculating the spatial position information of the first home device, sending third prompt information, where the third prompt information is used to prompt the user that position marking of the first home device is completed, and prompt the user that the electronic device can be operated to directionally control the first home device.

In another possible design of the second aspect, when the computer instructions are executed by the electronic device, the electronic device is enabled to further perform the following step: in response to a second operation, obtaining spatial position-attitude information i of the electronic device when the electronic device points to the first home device in an orientation i in the n orientations, where i has a value in $\{1, 2, \ldots, n\}$ successively.

The second operation is a tap operation performed on a preset button in the electronic device or a preset control in the first prompt information when the user controls the electronic device to point to the first home device in the orientation i, the preset button is used to trigger the electronic device to obtain the spatial position-attitude information of the electronic device, and the preset control is used to trigger the electronic device to obtain the spatial position-attitude information of the electronic device.

In another possible design of the second aspect, the electronic device further includes an IMU chip. When the computer instructions are executed by the electronic device, the electronic device is enabled to further perform the following steps: when pointing to the first home device in the orientation i in the n orientations, interacting with m UWB base stations by using the UWB chip, to obtain a distance between the electronic device and each of the m UWB base stations, and calculating spatial position information i of the electronic device based on the obtained distance, where i has a value in $\{1, 2, \ldots, n\}$ successively, $m \geq 3$, m is an integer, and the m UWB base stations are provided by at least one home device including a UWB chip; and obtaining, by using the UWB chip and the IMU chip, spatial attitude information i of the electronic device when the electronic device points to the first home device in the orientation i.

In another possible design of the second aspect, the spatial position-attitude information i of the electronic device in the orientation i in the n orientations includes the spatial position information i of the electronic device in the orientation i and the spatial attitude information i of the electronic device in the orientation i, where i has a value in $\{1, 2, \ldots, n\}$ successively.

The spatial position information i of the electronic device in the orientation i is coordinates $(x_i, y_i, z_i)$ of the electronic device in a UWB coordinate system constructed by using the m UWB base stations when the electronic device points to the first home device in the orientation i, and the m UWB base stations are provided by the at least one home device including a UWB chip.

The spatial attitude information i of the electronic device in the orientation i includes a pitch angle $\varphi_i$, a yaw angle $\phi_i$, and a roll angle $\theta_i$ of a carrier coordinate system of the electronic device relative to the UWB coordinate system when the electronic device points to the first home device in the orientation i, and the carrier coordinate system is pre-configured in the electronic device.

The spatial position information of the first home device is coordinates (x, y, z) of the first home device in the UWB coordinate system.

In another possible design of the second aspect, when the computer instructions are executed by the electronic device, the electronic device is enabled to further perform the following step: calculating the spatial position information (x, y, z) of the first home device by using a preset rotation matrix based on the coordinates $(x_i, y_i, z_i)$ of the electronic device in the UWB coordinate system, the pitch angle $\varphi_i$, the yaw angle $\phi_i$, and the roll angle $\theta_i$ that are obtained when the electronic device points to the first home device in the n orientations.

The preset rotation matrix is a rotation matrix obtained when the electronic device transforms from a spatial attitude corresponding to the pitch angle $\varphi_i$, the yaw angle $\phi_i$, and the roll angle $\theta_i$ to a preset initial attitude: the preset initial attitude is an attitude of the electronic device that exists when three axes of the carrier coordinate system are respectively parallel to three axes of the UWB coordinate system; and the preset rotation matrix is used to convert a coordinate parameter in the carrier coordinate system into a coordinate parameter in the UWB coordinate system.

In another possible design of the second aspect, when the computer instructions are executed by the electronic device, the electronic device is enabled to further perform the following steps: determining whether a calculation error of the spatial position information of the first home device is less than a preset error threshold; and if the calculation error of the spatial position information of the first home device is less than the preset error threshold, storing the spatial position information of the first home device.

In another possible design of the second aspect, when the computer instructions are executed by the electronic device, the electronic device is enabled to further perform the following step: if the calculation error of the spatial position information of the first home device is less than the preset error threshold, sending the third prompt information, where the third prompt information is used to prompt the user that position marking of the first home device is completed, and prompt the user that the electronic device can be operated to directionally control the first home device.

In another possible design of the second aspect, when the computer instructions are executed by the electronic device, the electronic device is enabled to further perform the following step: if the calculation error of the spatial position information of the first home device is greater than or equal to the preset error threshold, sending fourth prompt information, where the fourth prompt information is used to request the user to determine whether to re-mark the position of the first home device.

According to a third aspect, this application provides a chip system. The chip system is applied to an electronic device including a display, a memory, and a communication module. The chip system integrates functions of a UWB chip and an IMU chip. The chip system includes one or more interface circuits and one or more processors. The interface circuit and the processor are interconnected through a line. The interface circuit is configured to receive a signal from the memory of the electronic device, and send the signal to the processor, where the signal includes computer instructions stored in the memory. When the processor executes the computer instructions, the electronic device performs the method according to any one of the first aspect and the possible designs of the first aspect.

According to a fourth aspect, this application provides a computer storage medium. The computer storage medium includes computer instructions, and when the computer instructions are run on an electronic device, the electronic device is enabled to perform the method according to any one of the first aspect and possible designs of the first aspect.

According to a fifth aspect, this application provides a computer program product. When the computer program product is run on a computer, the computer is enabled to perform the method according to any one of the first aspect and possible designs of the first aspect.

It may be understood that for beneficial effect achievable by the electronic device provided in the second aspect, the chip system in the third aspect, the computer storage medium in the fourth aspect, and the computer program product in the fifth aspect, refer to the beneficial effect in any one of the first aspect and possible designs of the first aspect. Details are not described herein again.

BRIEF DESCRIPTION OF DRAWINGS

FIG. 22 is a flowchart of another home device position marking method according to an embodiment of this application;

DESCRIPTION OF EMBODIMENTS

Figure 1:
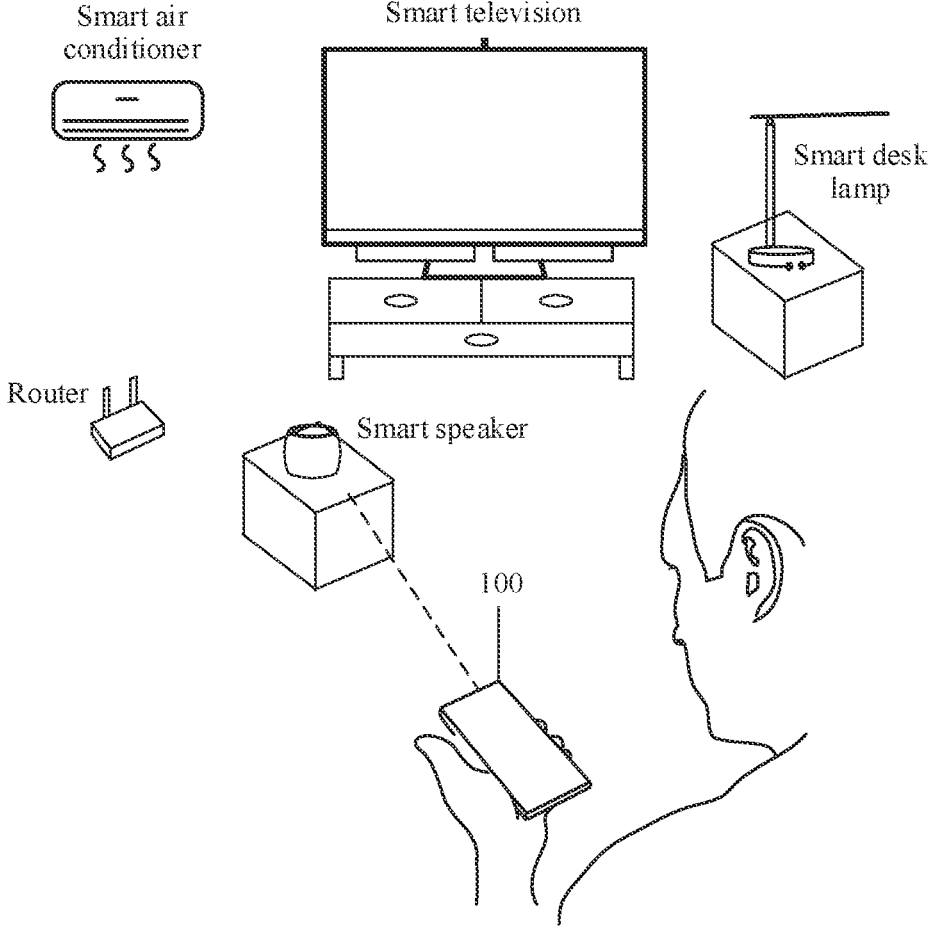
FIG. 1 is a schematic diagram of an application scenario of a home device position marking method according to an embodiment of this application.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

Embodiments of this application provide a home device position marking method. The method is used by a user to directionally control the home device by using an electronic device. For example, the electronic device is a mobile phone shown in FIG. 1. That the user directionally controls the home device by using the mobile phone specifically means: When the user operates the mobile phone to point to a position of a home device (for example, a smart speaker shown in FIG. 1), the mobile phone may automatically display a control interface 201 of the smart speaker shown in FIG. 2, so that the user operates and controls the smart speaker.

Generally, a placement position of the home device is fixed. Therefore, the home device to which the electronic device points in a plurality of home devices may be determined based on placement positions (also referred to as spatial positions) of the plurality of home devices and a spatial attitude of the electronic device. The spatial attitude of the electronic device may reflect an orientation of the electronic device.

In conclusion, the electronic device may mark positions of the plurality of home devices (that is, obtain spatial position information of each home device), and then detect a spatial attitude of the electronic device in real time, so that the home devices can be directionally and quickly controlled based on the real-time spatial attitude of the electronic device and the spatial positions of the home devices.

It should be understood that an example in which the electronic device is the mobile phone is used. Based on habits of using the mobile phone by most users, an orientation of the mobile phone (or a direction of the mobile phone) may be defined as a direction parallel to a long side of the mobile phone and pointing from a bottom of the mobile phone to a top. Therefore, the orientation of the mobile phone may be referred to as a top orientation of the mobile phone. Generally, the top of the mobile phone is a body part provided with hardware such as a front-facing camera, an infrared transmitter, an earpiece, a light sensor, or a distance sensor. The bottom of the mobile phone is a body part provided with a microphone and a speaker.

In some solutions, an ultra-wideband (ultra-wideband, UWB) apparatus is provided on the electronic device and each home device. The UWB apparatus may be a UWB chip or a hardware apparatus provided with a UWB chip. The home device may measure a distance between the home device and a UWB base station and position the UWB base station by communicating with the UWB base station, and report spatial position information of the home device to the UWB base station. Then, the UWB base station may provide the electronic device with the spatial position information of each home device. Some home devices in the plurality of home devices may be used as UWB base stations.

Not all home devices are equipped with the UWB chip. According to the solution, the electronic device cannot mark a position of a home device for which no UWB chip is configured. In addition, if the UWB chip is additionally disposed in this type of home device (namely, a home device provided with no UWB apparatus), to support the electronic device in marking the position of the home device, there is no doubt that costs are increased.

In addition, according to the solution, for a home device located in a weak-signal coverage area or a no-signal coverage area of the UWB base station, the electronic device cannot accurately mark a position of the home device. In this way, accuracy of directional control performed by the electronic device on the home device is affected, and user experience is affected.

In some other solutions, for the home device provided with no UWB chip, a mobile phone provided with a UWB chip may be used to replace the home device, to mark the position of the home device. For example, the mobile phone may be placed at the position of the home device, and then a position of the mobile phone is marked. In this case, spatial position information of the mobile phone may be used as spatial position information of the home device. However, this solution is not applicable to all home devices. For example, when a position of a home device, such as a chandelier or a surveillance camera, that the mobile phone is difficult to approach is marked, the solution is difficult to operate.

In addition, according to this solution, for the home device in the weak-signal coverage area or the no-signal coverage area of the UWB base station, the position of the home device still cannot be accurately marked. In this way, accuracy of directional control performed by the electronic device on the home device is affected, and user experience is affected.

Therefore, embodiments of this application provide a home device position marking method. The method may be applied to a communication system shown in FIG. 1. The communication system includes an electronic device (for example, a mobile phone or a smart remote control) 100 and a plurality of home devices (such as a smart television, a smart air conditioner, a smart desk lamp, a smart speaker, and a router).

A UWB apparatus and an IMU apparatus are provided on the electronic device 100. However, in embodiments of this application, it is not required that the home device is provided with the UWB apparatus. The UWB apparatus may be a UWB chip or a hardware apparatus provided with a UWB chip. The IMU apparatus may be an IMU chip or a hardware apparatus provided with an IMU chip.

In embodiments of this application, the electronic device 100 on which the UWB apparatus and the IMU apparatus are configured may be operated, to separately point to a home device in a plurality of positions, so that the electronic device 100 marks a position of the home device. According to the method in embodiments of this application, even if no UWB apparatus is configured for the home device, the electronic device 100 may still mark the position of the home device. In addition, when the method in embodiments of this application is used to mark the position of the home device, accuracy of position marking is not affected by signal strength of a UWB base station. In other words, according to this solution, accuracy of marking the position of the home device by the electronic device can be further improved, thereby improving positioning accuracy when the electronic device directionally controls the home device.

For example, the electronic device 100 may be a mobile phone, a tablet computer, a smart remote control, a wearable device (for example, a smart band, a smart watch, or a pair of smart glasses), a palmtop computer, or an augmented reality (augmented reality, AR)/virtual reality (virtual reality, VR) device. Alternatively, the electronic device 100 may be an electronic device of another type, for example, a portable multimedia player (Portable Multimedia Player, PMP) or a media player. A specific type of the electronic device 100 is not limited in embodiments of this application.

Figure 3:
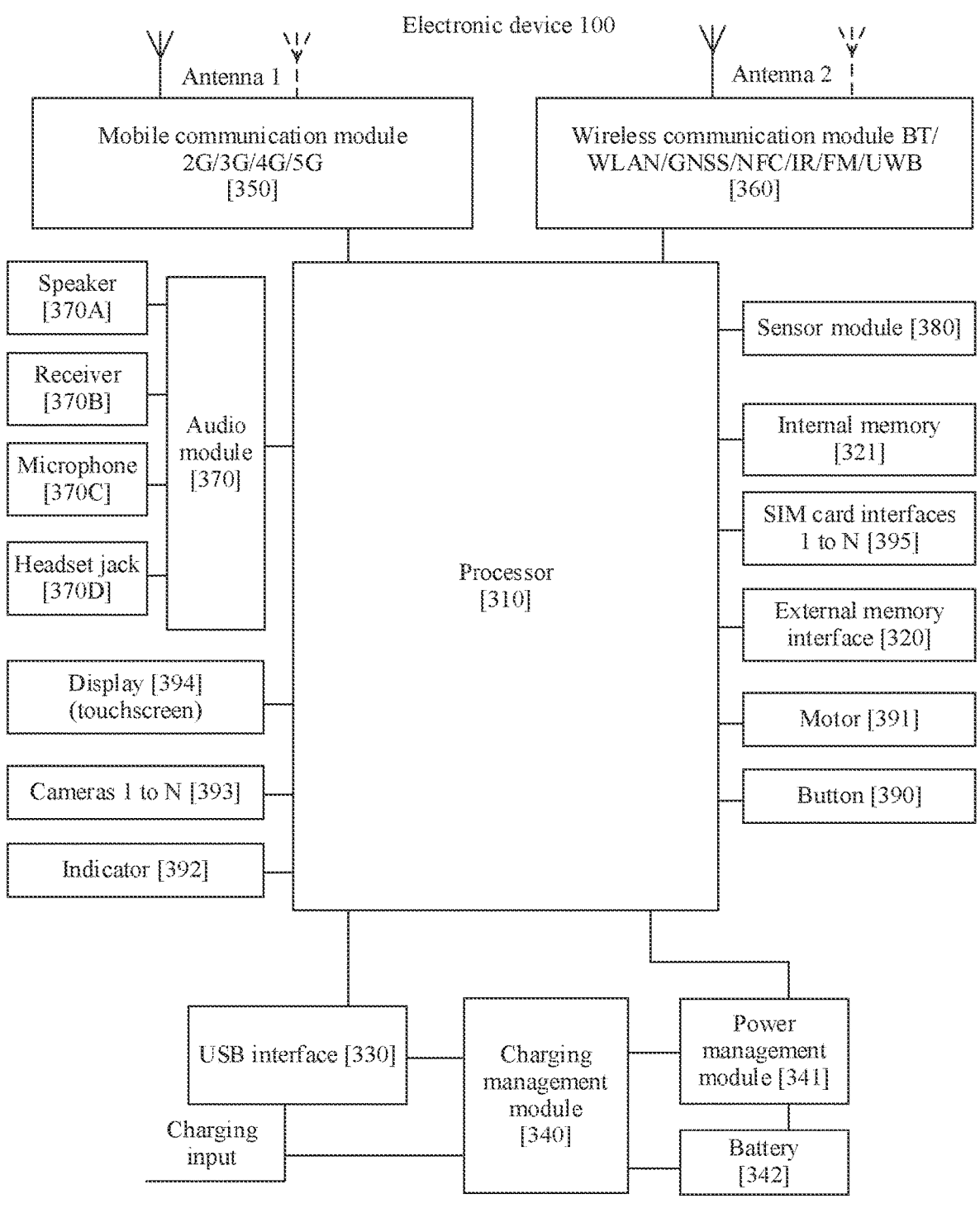
FIG. 3 is a schematic diagram of a hardware structure of an electronic device according to an embodiment of this application.

Refer to FIG. 3. In this application, an example in which the electronic device 100 is a mobile phone is used to describe the electronic device 100 provided in this application. As shown in FIG. 3, the electronic device 100 may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like.

The sensor module 380 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a magnetometer, a bone conduction sensor, and the like.

In some embodiments, the sensor module 380 may include three acceleration sensors and three gyroscope sensors. The three acceleration sensors and the three gyroscope sensors may form a 6-axis IMU. Alternatively, the sensor module 380 may include three acceleration sensors, three gyroscope sensors, and three magnetometers. The three acceleration sensors, the three gyroscope sensors, and the three magnetometers may form a 9-axis IMU. The IMU may measure a pitch angle, a yaw angle, and a roll angle of the electronic device 100. In the following embodiments, the pitch angle, the yaw angle, and the roll angle of the electronic device 100 are described with reference to the accompanying drawings.

It may be understood that a structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely used as an example for description, and does not constitute a limitation on a structure of the electronic device

100. In some other embodiments, the electronic device 100 may alternatively use an interface connection manner different from an interface connection manner in the foregoing embodiment, or use a combination of a plurality of interface connection manners.

The charging management module 340 is configured to receive a charging input from the charger. The charger may be a wireless charger or a wired charger. The charging management module 340 may further supply power to the electronic device by using the power management module 341 while charging the battery 342.

The power management module 341 is configured to be connected to the battery 342, the charging management module 340, and the processor 310. The power management module 341 receives an input of the battery 342 and/or the charging management module 340, and supplies power to the processor 310, the internal memory 321, an external memory, the display 394, the camera 393, the wireless communication module 360, and the like. In some embodiments, the power management module 341 and the charging management module 340 may alternatively be disposed in a same device.

A wireless communication function of the electronic device 100 may be implemented by using the antenna 1, the antenna 2, the mobile communication module 350, the wireless communication module 360, the modem processor, the baseband processor, and the like. In some embodiments, in the electronic device 100, the antenna 1 and the mobile communication module 350 are coupled, and the antenna 2 and the wireless communication module 360 are coupled, so that the electronic device 100 can communicate with a network and another device by using a wireless communication technology. For example, in this embodiment of this application, the electronic device 100 may send a control instruction to another home device by using the wireless communication technology.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communication module 350 may provide a wireless communication solution that includes 2G/3G/4G/5G or the like and that is applied to the electronic device 100. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering or amplification on the received electromagnetic wave, and transmit a processed electromagnetic wave to the modem processor for demodulation.

The mobile communication module 350 may further amplify a signal modulated by the modem processor, and convert an amplified signal into an electromagnetic wave for radiation through the antenna 1. In some embodiments, at least some functional modules in the mobile communication module 350 may be disposed in the processor 310. In some embodiments, at least some functional modules in the mobile communication module 350 may be disposed in a same device as at least some modules in the processor 310.

The wireless communication module 360 may provide a wireless communication solution that is applied to the electronic device 100 and that includes a wireless local area network (wireless local area network, WLAN)(for example, a wireless fidelity (Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, a UWB technology, and the like. For example, in this embodiment of this application, the electronic device 100 may access the Wi-Fi network by using the wireless communication module 360. For another example, in this embodiment of this application, the electronic device 100 may send a message to a home device by using the wireless communication module 360.

The UWB technology is a wireless carrier communication technology, where a sine carrier is not used to transmit data, but a nanosecond-level non-sinusoidal narrow impulse is used to transmit data. Therefore, in the UWB technology, a wide spectrum range is occupied. The UWB technology features low system complexity, low power spectrum density of transmit signals, insensitivity to channel fading, a low interception capability, high positioning accuracy, and the like, and is especially applicable to high-speed wireless access in dense multipath places such as indoor areas. In addition, the electronic device 100 may measure, by using the UWB technology, a distance between the electronic device 100 and a device supporting the UWB technology (for example, a home device provided with a UWB chip).

The wireless communication module 360 may be one or more components integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

The electronic device 100 implements a display function through the GPU, the display 394, the application processor, and the like. The GPU is a microprocessor for image processing, and is connected to the display 394 and the application processor. The GPU is configured to: perform mathematical and geometric computation, and render an image. The processor 310 may include one or more GPUs that execute program instructions to generate or change display information.

The display 394 is configured to display an image, a video, and the like. The display 394 includes a display panel. For example, in this embodiment of this application, the display 394 may be configured to display a control interface used to control the first device.

The electronic device 100 may implement a photographing function through the ISP, the camera 393, the video codec, the GPU, the display 394, the application processor, and the like. The ISP is configured to process data fed back by the camera 393. The camera 393 is configured to capture a static image or a video. In some embodiments, the electronic device 100 may include one or N cameras 393, where N is an integer greater than 1.

The external memory interface 320 may be configured to connect to an external storage card such as a micro SD card, to extend a storage capability of the electronic device 100. The external storage card communicates with the processor 310 through the external memory interface 320, to implement a data storage function. For example, files such as music and a video are stored in the external storage card.

The internal memory 321 may be configured to store computer-executable program code, and the executable program code includes instructions. The processor 310 performs various function applications of the electronic device 100 and data processing by running the instructions stored in the internal memory 321. For example, in this embodiment of this application, the processor 310 may execute the instructions stored in the internal memory 321. The internal memory 321 may include a program storage area and a data storage area.

The program storage area may store an operating system, an application required by at least one function (for example, a sound playing function or an image playing function), and the like. The data storage area may store data (for example, audio data or an address book) created during use of the electronic device 100, and the like. In addition, the internal memory 321 may include a high-speed random access memory, and may further include a nonvolatile memory, for example, at least one magnetic disk storage device, a flash memory, or a universal flash storage (universal flash storage, UFS).

The electronic device 100 may implement an audio function, for example, music playing and recording, through the audio module 370, the speaker 370A, the receiver 370B, the microphone 370C, the headset jack 370D, the application processor, and the like.

The button 390 includes a power button, a volume button, and the like. The button 390 may be a mechanical button or a touch button. The motor 391 may generate a vibration prompt. The motor 391 may be configured to provide an incoming call vibration prompt and a touch vibration feedback. The indicator 392 may be an indicator light, and may be configured to indicate a charging status and a power change, or may be configured to indicate a message, a missed call, a notification, and the like. The SIM card interface 395 is configured to be connected to a SIM card. The SIM card may be inserted into the SIM card interface 395 or removed from the SIM card interface 395, to implement contact with or separation from the electronic device 100. The electronic device 100 may support one or N SIM card interfaces, where N is an integer greater than 1. The SIM card interface 395 may support a nano-SIM card, a micro-SIM card, a SIM card, and the like.

All methods in the following embodiments may be implemented in the electronic device having the hardware structure.

Embodiments of this application provide a home device position marking method. The method is used to support the electronic device 100 shown in FIG. 1 in directional control on the home device. The electronic device 100 may separately mark positions of a plurality of home devices (that is, obtain spatial position information of each home device), and then detect a spatial attitude of the electronic device in real time, so that the home devices can be directionally and quickly controlled based on the real-time spatial attitude of the electronic device and the spatial positions of the home devices.

The spatial attitude of the electronic device 100 may be represented by spatial attitude information of the electronic device 100. The spatial attitude information of the electronic device 100 may include a pitch (pitch) angle $\varphi$, a yaw (yaw) angle $\phi$, and a roll (roll) angle $\theta$ of a carrier coordinate system of the electronic device 100 relative to a UWB coordinate system (which is also referred to as a fixed coordinate system) of a UWB base station. The yaw angle may also be referred to as a yaw angle.

For ease of understanding, the following describes the carrier coordinate system of the electronic device 100, the UWB base station, the UWB coordinate system of the UWB base station, and the pitch angle $\varphi$, the yaw angle $\phi$, and the roll angle $\theta$ of the carrier coordinate system relative to the UWB coordinate system with reference to the accompanying drawings.

(1) The Carrier Coordinate System of the Electronic Device 100.

Figure 4:
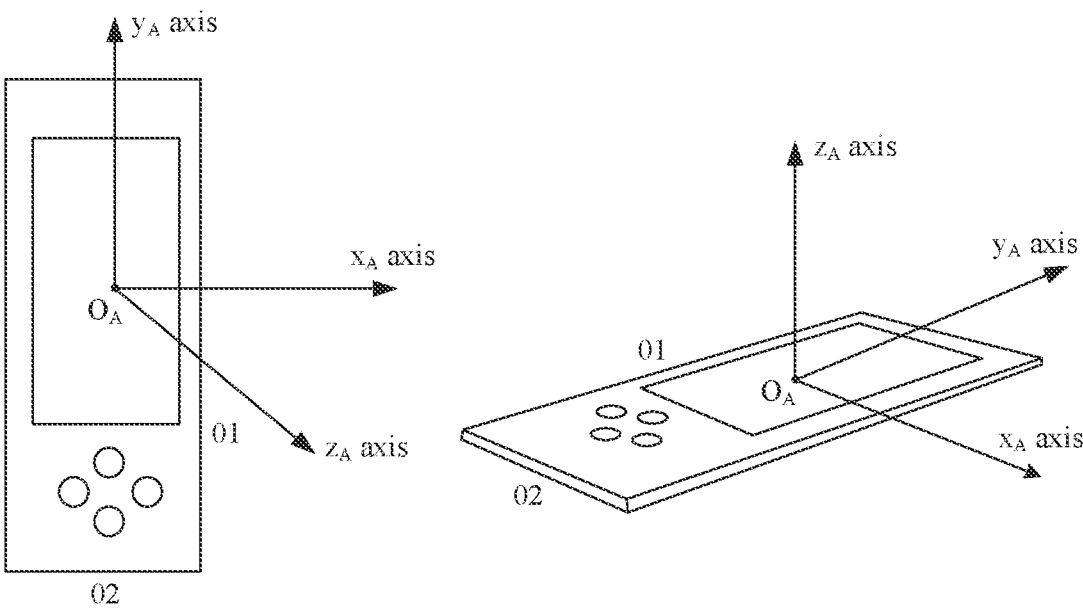
FIG. 4 is a schematic diagram of a carrier coordinate system of an electronic device (for example, a smart remote control) according to an embodiment of this application.

For example, the electronic device 100 is a smart remote control. FIG. 4 is a schematic diagram of an example of a carrier coordinate system of the smart remote control. The carrier coordinate system of the smart remote control may be preconfigured in the smart remote control.

As shown in FIG. 4, $O_A$ is used as a coordinate origin, and an $x_A$ axis, a $y_A$ axis, and a $z_A$ axis form a right-hand rectangular coordinate system. $O_A$ shown in FIG. 4 may be a center of gravity of the smart remote control. Alternatively. $O_A$ shown in FIG. 4 may be an IMU center of the smart remote control. Generally, an IMU of the smart remote control may be disposed at the center of gravity of the smart remote control. The smart remote control may include four sides: a long side 01, a short side 02, another long side that is parallel to the long side 01 and that has an equal length, and another short side that is parallel to the short side 02 and that has an equal length. The $x_A$ axis is parallel to the short side 02 of the smart remote control, and the $y_A$ axis is parallel to the long side 01 of the smart remote control and is upward. The $z_A$ axis is perpendicular to the $y_A$ axis, and is perpendicular to the $x_B$ axis. The coordinate system shown in FIG. 4 is the carrier coordinate system of the smart remote control.

Figure 5:
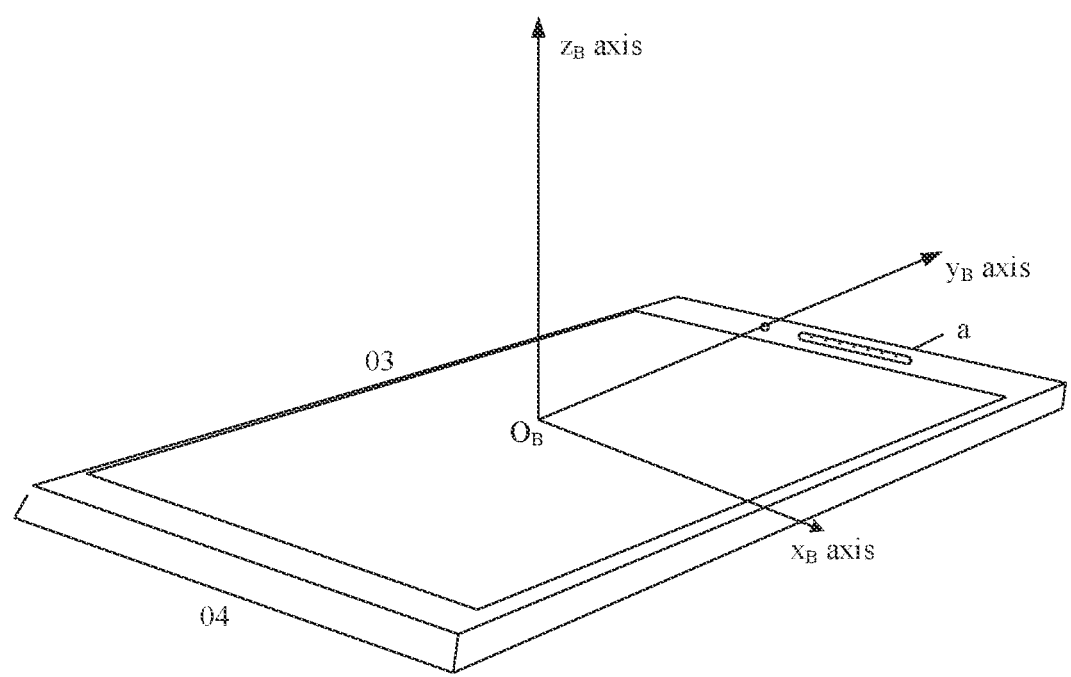
FIG. 5 is a schematic diagram of a carrier coordinate system of another electronic device (for example, a mobile phone) according to an embodiment of this application.

For another example, the electronic device 100 is a mobile phone. FIG. 5 is a schematic diagram of an example of a carrier coordinate system of the mobile phone. The carrier coordinate system of the mobile phone may be preconfigured in the mobile phone.

As shown in FIG. 5, $O_B$ is used as a coordinate origin, and an $x_B$ axis, a $y_B$ axis, and a $z_B$ axis form a right-hand rectangular coordinate system. On shown in FIG. 5 may be a center of gravity of the mobile phone. Alternatively, $O_B$ shown in FIG. 5 may be an IMU center of the mobile phone. Generally, an IMU of the mobile phone may be disposed at the center of gravity of the mobile phone. The mobile phone may include four sides: a long side 03, a short side 04, another long side that is parallel to the long side 03 and that has an equal length, and another short side that is parallel to the short side 04 and that has an equal length. The $x_B$ axis is parallel to the short side 04 of the mobile phone. The ye axis is parallel to the long side 01 of the mobile phone and is upward. The $z_B$ axis is perpendicular to the $y_A$ axis, and is perpendicular to the $x_B$ axis. The coordinate system shown in FIG. 5 is the carrier coordinate system of the mobile phone.

(2) The UWB Base Station

The UWB base station may be an apparatus provided with a UWB chip, or a home device provided with a UWB chip. For example, some home devices in the communication system shown in FIG. 1 may be used as UWB base stations. The UWB base station is configured to assist the electronic device 100 in determining a home device to which the electronic device 100 points.

Figure 2:
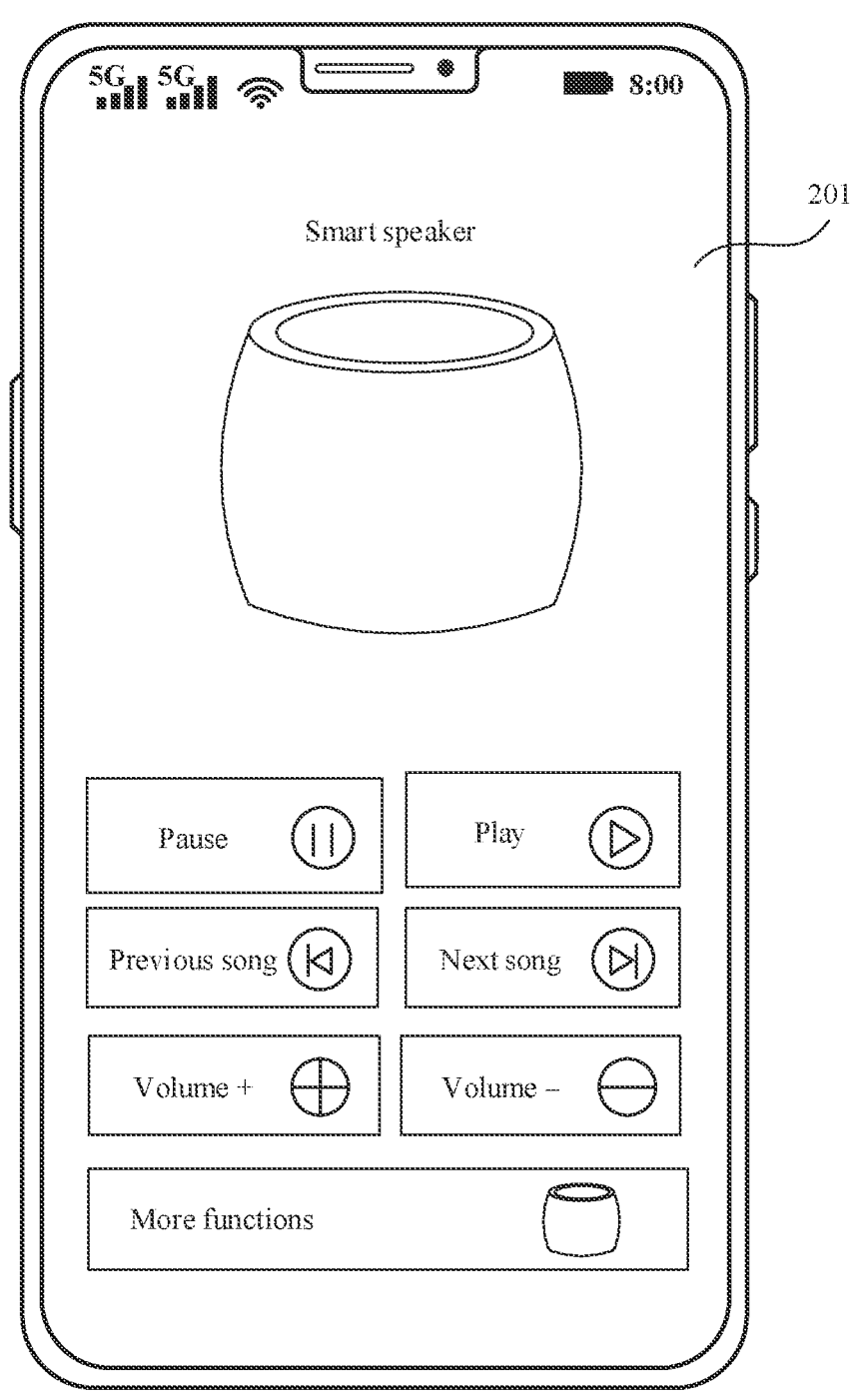
FIG. 2 is a schematic diagram of a control interface of a smart home according to an embodiment of this application.

Some home devices may be provided with one or more UWB chips. For example, the smart television shown in FIG. 1 may include three UWB chips. The three UWB chips may be separately located at positions of a base 0, a base 1, and a base 2 shown in FIG. 6 on the smart television. For another example, the smart air conditioner shown in FIG. 1 may include one UWB chip. Certainly, some home devices are provided with no UWB chip. For example, the smart speaker and the smart desk lamp shown in FIG. 1 are provided with no UWB chip.

The home device that may be used as the UWB base station may provide at least one UWB base station. For example, it is assumed that the smart television shown in FIG. 1 includes three UWB chips. The smart television may provide three UWB base stations, such as the base 0, the base 1, and the base 2 shown in FIG. 6. It is assumed that the smart air conditioner shown in FIG. 1 includes one UWB chip, and the smart air conditioner may provide one UWB base station.

(3) The UWB Coordinate System of the UWB Base Station.

The UWB coordinate system in this embodiment of this application may be constructed by using at least three UWB base stations. In this embodiment of this application, an example in which the UWB coordinate system is constructed by using three UWB base stations is used. The three UWB base stations have the following features. The three UWB base stations are located on a same plane (which is referred to as a UWB plane). Two coordinate axes of the UWB coordinate system constructed by using the three UWB base stations are on the UWB plane, and the other coordinate axis is perpendicular to the UWB plane.

In some embodiments, the three UWB base stations may be provided by a large-screen device. The large-screen device includes one display (including a display panel, for example, a liquid crystal panel) and a plurality of (three or more) UWB chips. For example, the large-screen device may be the smart television shown in FIG. 1. The smart television includes a display and three UWB chips. The display of the smart television may be used as a UWB plane. The smart television may provide three UWB base stations, such as the base 0, the base 1, and the base 2 shown in FIG. 6.

Figure 6:
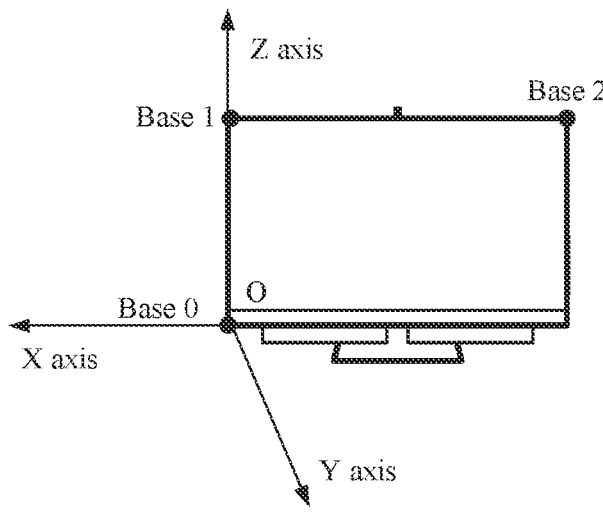
FIG. 6 is a schematic diagram of a UWB coordinate system of a UWB base station according to an embodiment of this application.

FIG. 6 is a schematic diagram of an example of the UWB coordinate system according to an embodiment of this application. As shown in FIG. 6, O is used as a coordinate origin, and an X axis, a Y axis, and a Z axis form a right-hand rectangular coordinate system. The coordinate origin O shown in FIG. 6 may be an antenna center of a UWB base station-base 0 provided by the smart television, namely, an antenna center of a UWB chip corresponding to the base 0. The X axis is parallel to a bottom of the smart television and points to the outside of the screen. The Z axis is perpendicular to a plane on which the X axis is located and points to an antenna center of another UWB base station-base 1 provided by the smart television, namely, an antenna center of a UWB chip corresponding to the base 1. The Y axis is perpendicular to the X axis, and is perpendicular to the Z axis. The Y axis is parallel to an orientation of the display of the smart television. The coordinate system shown in FIG. 6 is a UWB coordinate system. Generally, the position of the home device is fixed. Therefore, the UWB coordinate system of the UWB base station may also be referred to as a fixed coordinate system.

In some other embodiments, the three UWB base stations may be three home devices each provided with the UWB chip. For example, the smart television, the smart speaker, and the smart air conditioner shown in FIG. 1 each may be provided with the UWB chip, and the router, the smart television, and the smart air conditioner may form a UWB plane. For a method for constructing a UWB coordinate system by using the router, the smart television, and the smart air conditioner, refer to the method for constructing the UWB coordinate system by using the base 0, the base 1, and the base 2 of the smart television in the foregoing embodiment. Details are not described herein again in this embodiment of this application.

In some other embodiments, the three UWB base stations may be one or more dedicated UWB apparatuses specially configured to assist the electronic device 100 in determining the home device to which the electronic device 100 points. The dedicated UWB apparatus includes a UWB chip. For a method for constructing a UWB coordinate system by using the dedicated UWB apparatuses, refer to the method for constructing the UWB coordinate system by using the base 0, the base 1, and the base 2 of the smart television in the foregoing embodiment. Details are not described herein again in this embodiment of this application.

In some other embodiments, the UWB base station may be provided by a device including a preset plane. The device further includes at least three UWB chips. The at least three UWB chips are installed on the preset plane. The preset plane may be a plane whose area is greater than a preset threshold.

It can be learned from the descriptions that the three UWB base stations used to construct the UWB coordinate system have the following features: The three UWB base stations are located on a same plane (which is referred to as a UWB plane). Two coordinate axes of the UWB coordinate system constructed by using the three UWB base stations are on the UWB plane, and the other coordinate axis is perpendicular to the UWB plane.

The preset plane in this embodiment is the UWB plane. The at least three UWB chips are installed on the preset plane, so that the UWB coordinate system can be conveniently constructed. For example, the device including the preset plane may be a refrigerator including at least three UWB chips. The preset plane may be a front surface or a side surface of the refrigerator, and the at least three UWB chips are disposed on the preset plane of the refrigerator.

It may be understood that a home of a user is usually provided with a large-screen device (for example, a smart television). Therefore, the large-screen device may be usually used as a UWB base station. In this way, the user does not need to purchase a UWB base station, so that costs are reduced. In the following embodiments, an example in which the UWB base station is a smart television (namely, a reference device) is used to describe the method in embodiments of this application.

(4) the Pitch Angle φ, the Yaw Angle ϕ, and the Roll Angle θ of the Carrier Coordinate System of the Electronic Device 100 Relative to the UWB Coordinate System.

The pitch angle φ of the carrier coordinate system of the electronic device 100 relative to the UWB coordinate system is an included angle between the $y_B$ axis of the carrier coordinate system of the electronic device 100 and a plane (that is, equivalent to a horizontal plane) on which XOY of the UWB coordinate system is located.

Figure 7:
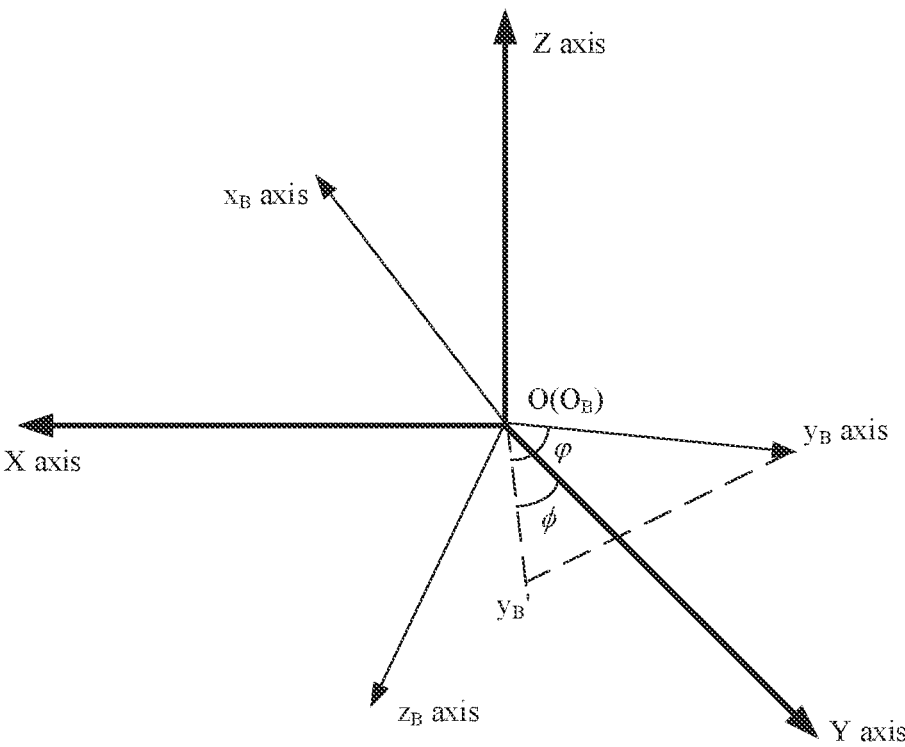
FIG. 7 is a schematic diagram of a pitch angle φ and a yaw angle φ of a carrier coordinate system of an electronic device relative to a UWB coordinate system of a UWB base station according to an embodiment of this application.

For example, the electronic device 100 is the mobile phone shown in FIG. 5. As shown in FIG. 7, a pitch angle φ of the carrier coordinate system of the mobile phone relative to the UWB coordinate system is an included angle between the $y_B$ axis and the plane (that is, equivalent to the horizontal plane) on which XOY is located. As shown in FIG. 7, $Oy_B'$ is a vertical projection of the ye axis on the plane on which XOY is located. It may be understood that the pitch angle φ of the carrier coordinate system of the mobile phone relative to the UWB coordinate system is an included angle between $Oy_B'$ (namely, $O_By_B'$) and the $y_B$ axis. When an angle between the ye axis and the Z axis is greater than 90°, the pitch angle φ is positive.

The yaw angle ϕ of the carrier coordinate system of the electronic device 100 relative to the UWB coordinate system is an included angle between the vertical projection $Oy_B'$ of the $y_B$ axis of the carrier coordinate system of the electronic device 100 on the plane on which XOY is located and the Y axis of the UWB coordinate system.

For example, the electronic device 100 is the mobile phone shown in FIG. 5. As shown in FIG. 7, a yaw angle ϕ of the carrier coordinate system of the mobile phone relative to the UWB coordinate system is an included angle between the vertical projection $Oy_B'$ of the $y_B$ axis of the carrier coordinate system of the mobile phone on the plane on which XOY is located and the Y axis of the UWB coordinate system. When $Oy_B'$ (namely, $O_By_B'$) deflects clockwise on the plane on which XOY is located with a change of the $y_B$ axis, the yaw angle ϕ is positive.

The roll angle θ of the carrier coordinate system of the electronic device 100 relative to the UWB coordinate system is an included angle between the $z_B$ axis of the carrier coordinate system of the electronic device 100 and a plane (equivalent to a vertical plane) on which $y_BOZ$ is located.

Figure 8:
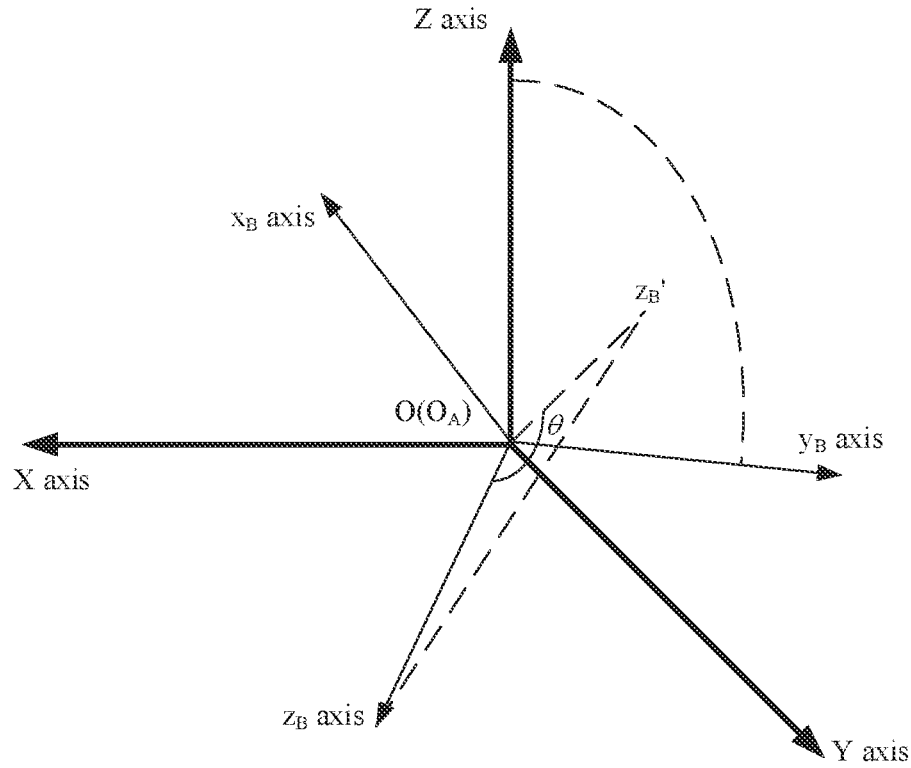
FIG. 8 is a schematic diagram of a roll angle θ of a carrier coordinate system of an electronic device relative to a UWB coordinate system of a UWB base station according to an embodiment of this application.

For example, the electronic device 100 is the mobile phone shown in FIG. 5. As shown in FIG. 8, a roll angle θ of the carrier coordinate system of the mobile phone relative to the UWB coordinate system is an included angle between the $z_B$ axis of the carrier coordinate system of the mobile phone and the plane (equivalent to a vertical plane) on which $y_BOZ$ and the ye axis are located. As shown in FIG. 8, $Oz_B'$ (namely, $O_Bz_B'$) is a vertical projection of the $z_B$ axis on the plane on which $y_BOZ$ and the ye axis are located. It may be understood that the roll angle θ of the carrier coordinate system of the mobile phone relative to the UWB coordinate system is an included angle between $Oz_B'$ (namely, $O_Bz_B'$) and the $z_B$ axis. When the $z_B$ axis is rotated clockwise, the roll angle θ is positive.

It should be noted that FIG. 4 is merely used as an example to describe the carrier coordinate system of the smart remote control, and FIG. 5 is merely used as an example to describe the carrier coordinate system of the mobile phone. The carrier coordinate system of the electronic device 100 may alternatively be defined according to another rule. For example, the coordinate origin may alternatively be any other point on the electronic device 100 or outside the electronic device 100. Directions of the three axes of the carrier coordinate system are not limited to directions shown by the $x_A$ axis, the $y_A$ axis, and the $z_A$ axis shown in FIG. 4, or directions shown by the $x_B$ axis, the $y_B$ axis, and the $z_B$ axis shown in FIG. 5. FIG. 6 is merely used as an example to describe the UWB coordinate system of the UWB base station. The UWB coordinate system of the UWB base station may alternatively be defined according to another rule. Directions of the three axes of the UWB coordinate system are not limited to directions shown by the X axis, the Y axis, and the Z axis shown in FIG. 6. In this embodiment of this application, setting of positions of the coordinate origins and directions of the coordinate axes of the carrier coordinate system and the UWB coordinate system is not limited. The following describes the method in embodiments of this application with reference to specific embodiments.

Embodiments of this application provide a home device position marking method, and the method may be applied to the electronic device 100. In the following embodiments, an example in which the electronic device 100 shown in FIG.

1 is a mobile phone 100 and a UWB base station is the smart television shown in FIG. 1 is used to describe the method in embodiments of this application.

The smart television may provide three UWB base stations, such as the base 0, the base 1, and the base 2 shown in FIG. 6. The UWB coordinate system shown in FIG. 6 may be constructed by using the three UWB base stations. The mobile phone includes a UWB apparatus (for example, a UWB chip) and an IMU apparatus (for example, an IMU chip). The carrier coordinate system shown in FIG. 5 is configured in the mobile phone. It should be noted that in this embodiment of this application, it is not required that each home device is provided with a UWB chip.

The mobile phone 100 is further provided with a smart home app used to control the home device. The mobile phone 100 may directionally control a plurality of home devices by using the smart home app. To implement directional control on the plurality of home devices, positions of the plurality of home devices need to be separately marked. In the plurality of home devices, there may be one or more home devices provided with no UWB chip. The mobile phone 100 may perform the method in embodiments of this application, to mark a position of such a home device (namely, a home device provided with no UWB chip). Certainly, when performing the method in embodiments of this application, the mobile phone may also mark a position of a home device provided with a UWB chip.

Before the mobile phone 100 marks the position of the home device, the mobile phone 100 may bind the home device in the smart home app. The smart home app may be an application corresponding to an icon "Home" 901 shown in FIG. 9(*a*). The mobile phone 100 may receive a tap operation performed by a user on the icon "Home" 901. In response to the tap operation, the mobile phone 100 may start the smart home app, and display a home page 902 of the smart home app shown in FIG. 9(*b*). The home page 902 of the smart home app includes an "Add devices" option 903. The "Add devices" option 903 is used to trigger the mobile phone 900 to search for a home device, to bind the home device. For example, as shown in FIG. 9(*b*), the home page 902 of the smart app further includes prompt information "Add home devices to bind smart home devices such as a light, a door lock, a camera, and a washing machine!".

Figure 9A:
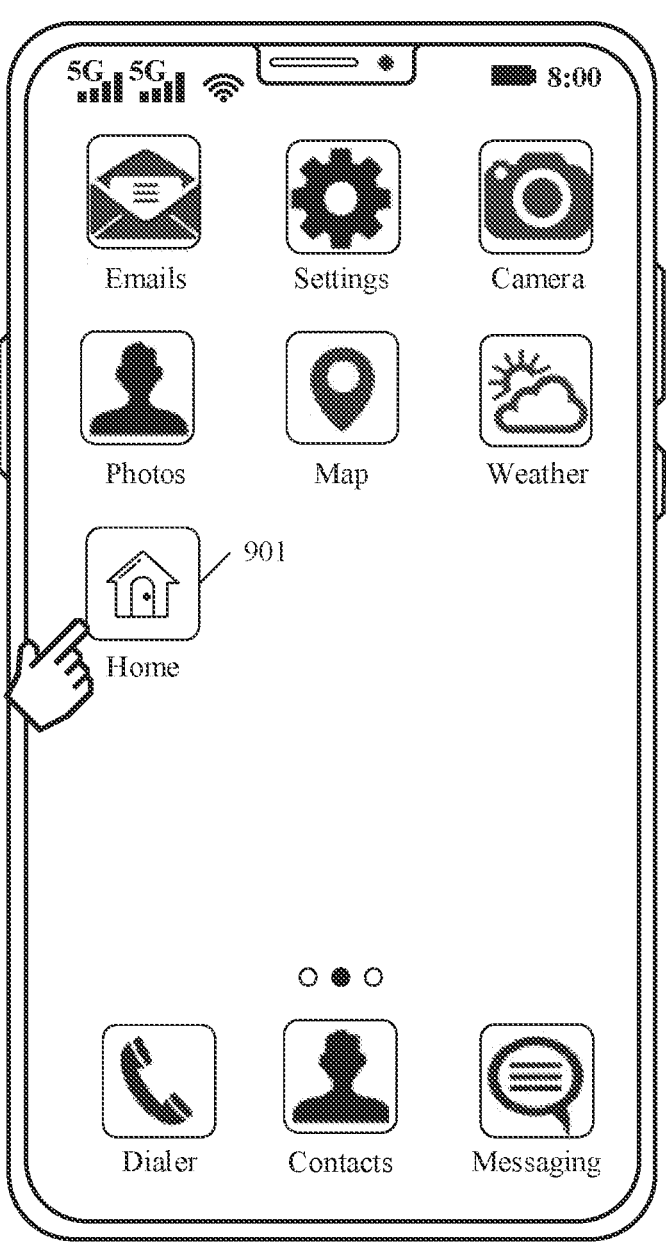
FIG. 9(*a*) to FIG. 9(*c*) are a schematic diagram of a display interface of an electronic device according to an embodiment of this application.
Figure 9B:
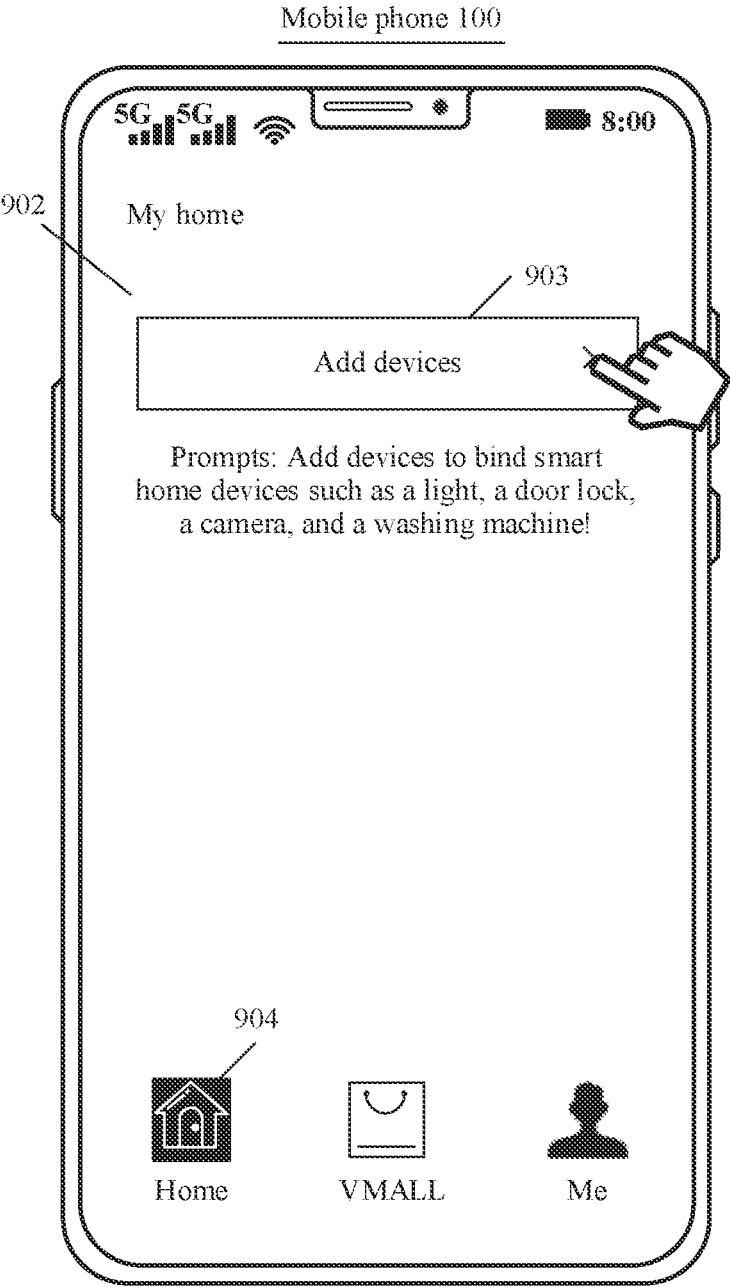
Figure 9C:
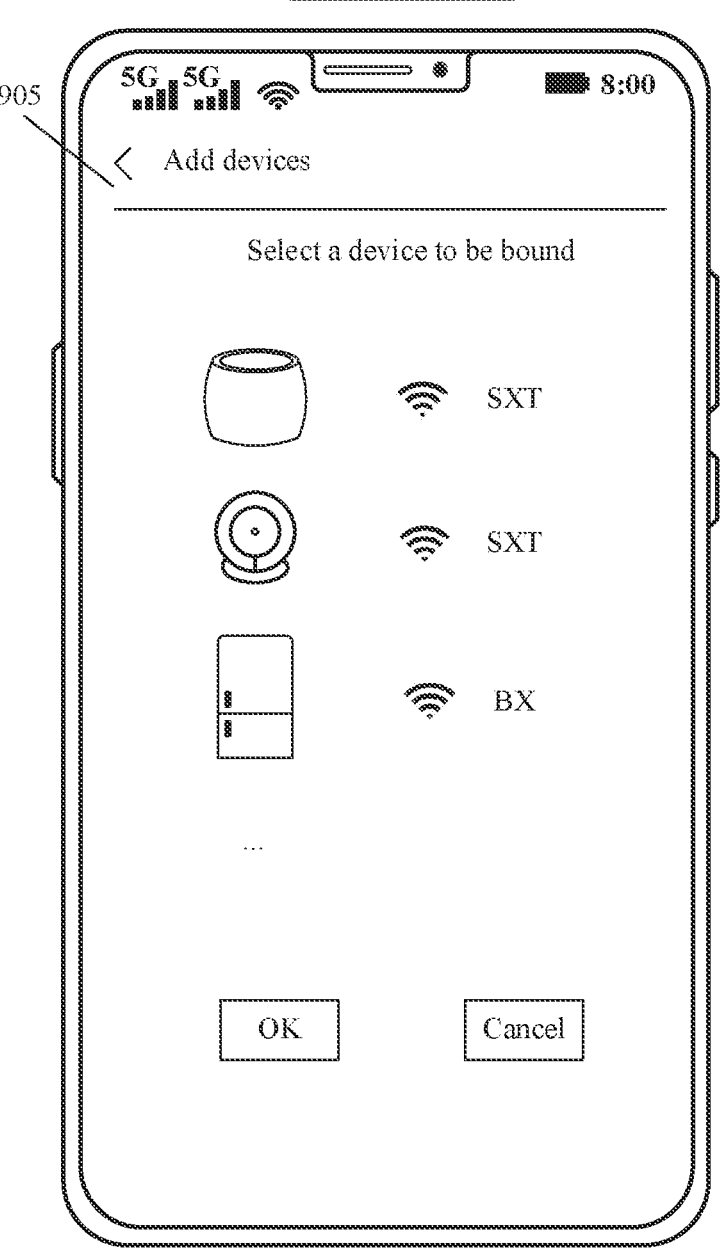

In response to a tap operation performed by the user on the "Add devices" option 903, the mobile phone 900 may display a device search interface (or may be referred to as a device adding interface) 904 shown in FIG. 9(*c*). The device search interface 905 includes identifiers (for example, icons) of one or more candidate home devices that can be found by the mobile phone 900. For example, the device search interface 905 shown in FIG. 9(*c*) includes icons of a smart speaker, a refrigerator, and a camera. In response to a selection operation performed by the user on the icon of the smart speaker, the mobile phone 100 may bind the smart speaker in the smart home app. Then, the mobile phone 100 may mark a position of a bound home device (for example, the smart speaker). The following describes the method provided in embodiments of this application with reference to the accompanying drawings.

Figure 10:
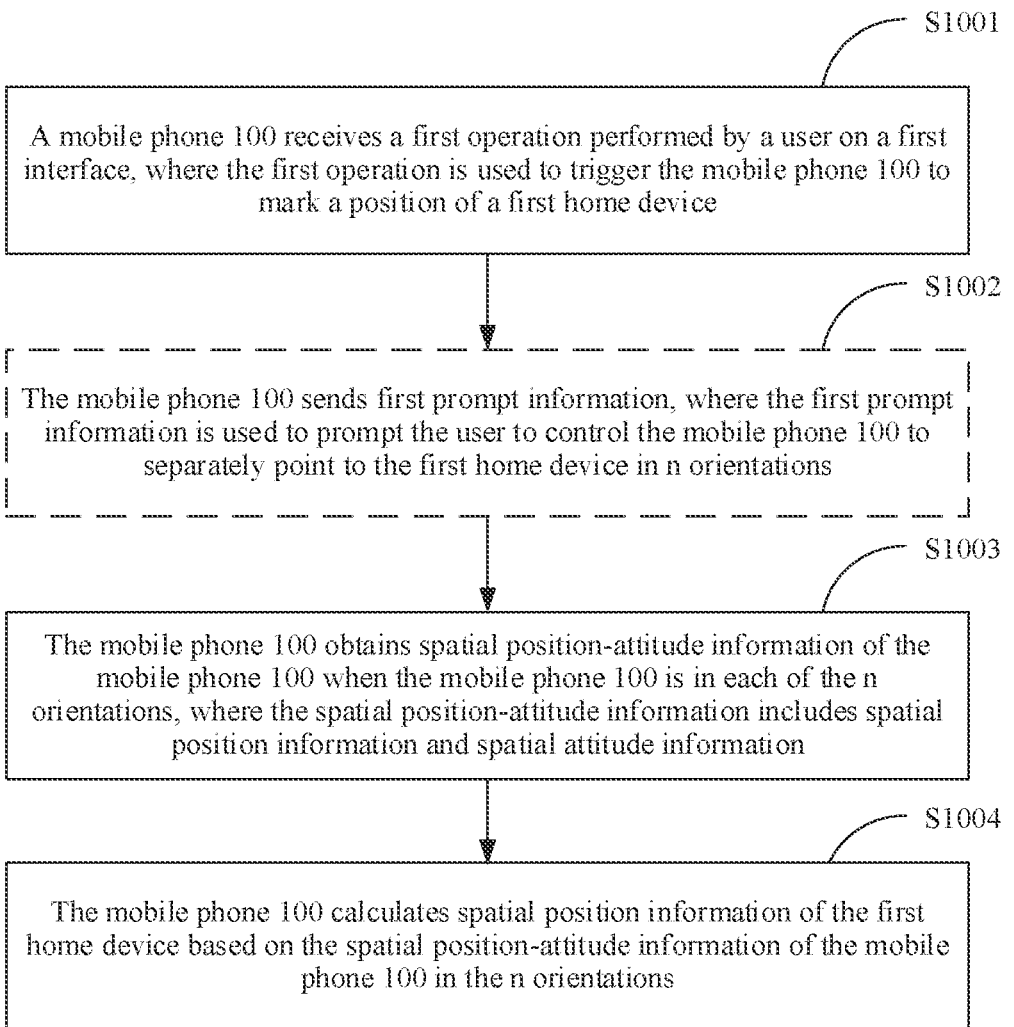
FIG. 10 is a flowchart of a home device position marking method according to an embodiment of this application.

Embodiments of this application provide a home device position marking method. As shown in FIG. 10, the method may include S1001 to S1004.

S1001: A mobile phone 100 receives a first operation performed by a user on a first interface. The first operation is used to trigger the mobile phone 100 to mark a position of a first home device.

In some embodiments, the first interface is a device management interface of a smart home app. The device management interface includes icons of a plurality of home devices bound to the smart home app. The plurality of home devices include the first home device.

Figure 11:
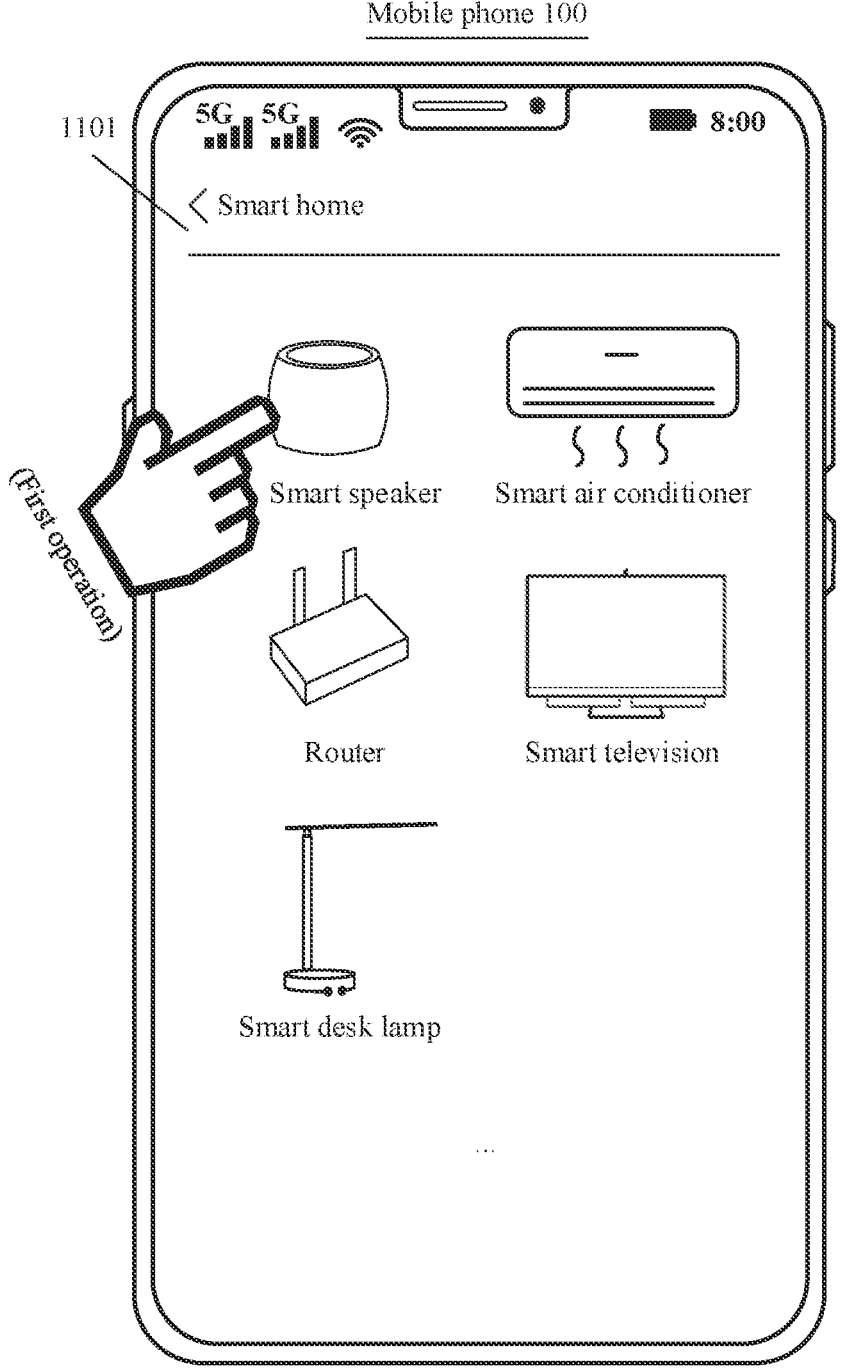
FIG. 11 is a schematic diagram of another display interface of an electronic device according to an embodiment of this application.

For example, the mobile phone 100 may display a device management interface (namely, a first interface) 1101 shown in FIG. 11. The first interface 1101 includes an icon of a smart speaker, an icon of a smart air conditioner, an icon of a router, an icon of a smart television, and an icon of a smart desk lamp. For example, the mobile phone 100 may receive a tap operation performed by the user on a "Home" option 904 shown in FIG. 9(*b*). In response to the tap operation performed by the user on the "Home" option 904, the mobile phone 100 may display the device management interface (namely, the first interface) 1101 shown in FIG. 11.

The mobile phone 100 may receive a preset operation (denoted as a preset operation) performed by the user on an icon of any home device (namely, the first home device) on the first interface 1101, to trigger the mobile phone to mark the position of the first home device. In other words, the first operation may be a preset operation 3 performed by the user on the icon of the any home device (namely, the first home device) on the first interface 1101. For example, the first home device may be the smart speaker.

For example, as shown in FIG. 11, the first operation may be any operation such as a touch and hold operation or a double tap operation performed by the user on the icon of the first home device (for example, the smart speaker). The first operation may trigger the mobile phone 100 to mark the position of the first home device.

Figure 12:
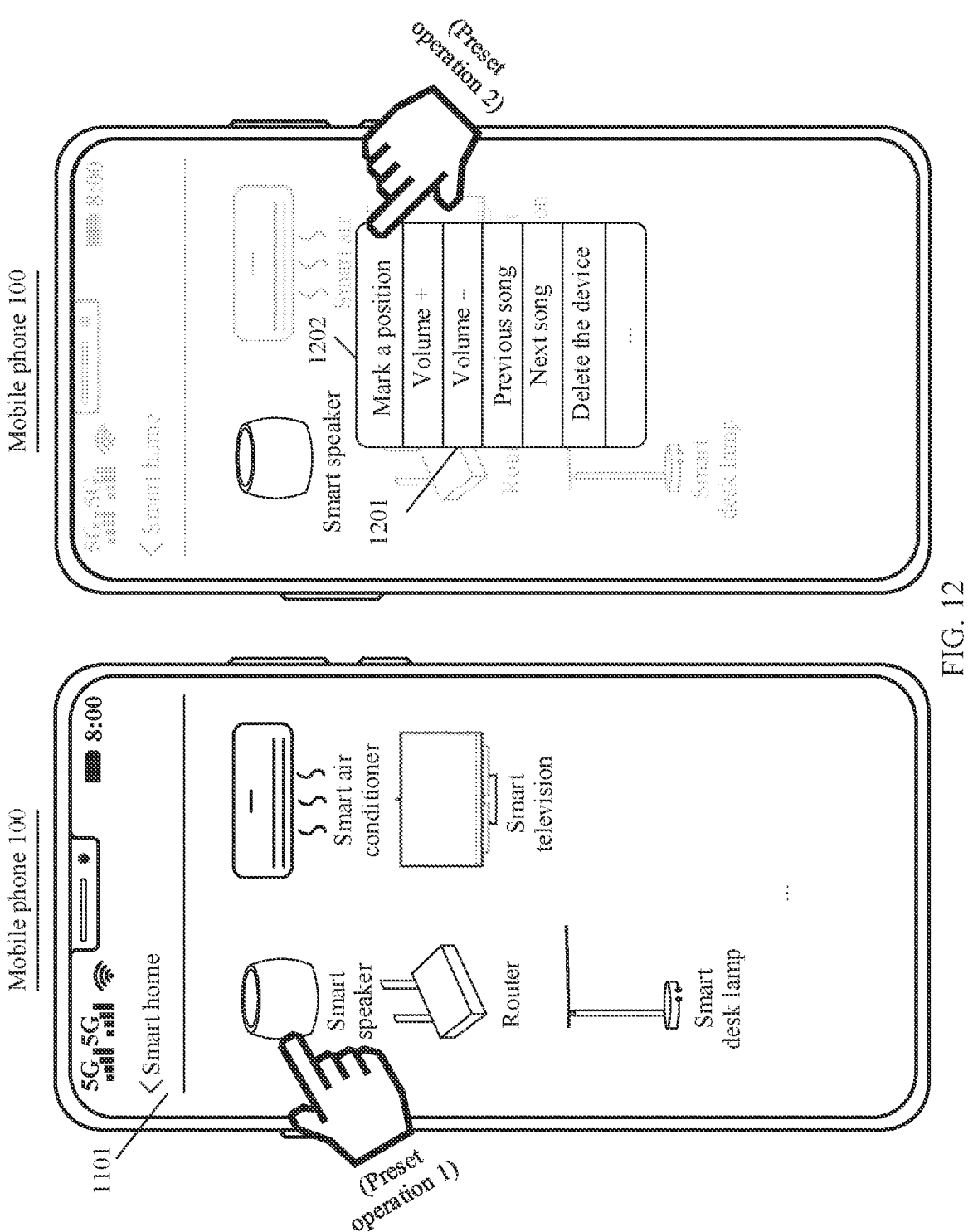
FIG. 12 is a schematic diagram of another display interface of an electronic device according to an embodiment of this application.

For another example, the mobile phone 100 may receive a preset operation 1 (for example, a touch and hold operation or a double tap operation) performed by the user on the icon of the smart speaker on the device management interface (namely, the first interface) 1101 shown in FIG. 11. In response to the preset operation 1 performed by the user on the icon of the smart speaker (namely, the first home device) on the first interface 1101 shown in FIG. 12, the mobile phone 100 may display a shortcut function menu 1201 of the smart speaker shown in FIG. 12. The shortcut function menu 1201 includes a preset function item (for example, a position marking function item) 1202 of the smart speaker, and the preset function item is used to trigger the mobile phone 100 to mark a position of the smart speaker. The mobile phone 100 may receive a preset operation 2 (for example, a single tap operation) performed by the user on the preset function item 1202. In response to the preset operation 2, the mobile phone 100 may mark the position of the first home device. The first operation may include the preset operation 1 and the preset operation 2, and the preset operation 2 may trigger the mobile phone 100 to mark the position of the first home device.

Figure 13:
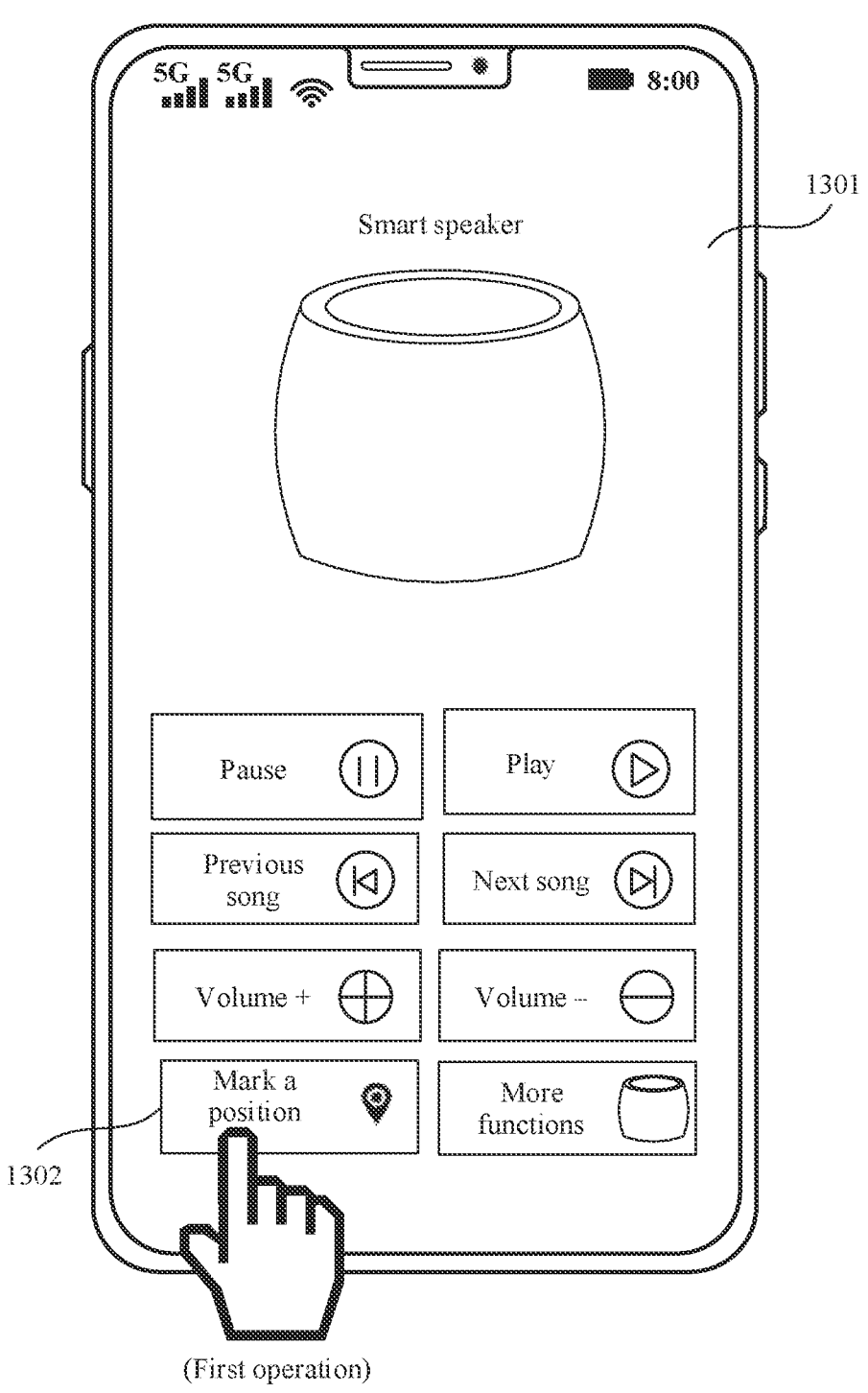
FIG. 13 is a schematic diagram of another display interface of an electronic device according to an embodiment of this application.

In some other embodiments, the first interface is a control interface of the first home device. The control interface of the first home device may include a plurality of control options of the first home device. For example, the first home device is the smart speaker. The mobile phone 100 may display a control interface 1301 of the smart speaker shown in FIG. 13.

The control interface of the first home device includes a preset function item (for example, a position marking function item) of the first home device, and the preset function item is used to trigger the mobile phone 100 to mark the position of the first home device. For example, the control interface 1301 shown in FIG. 13 may include the icon of the smart speaker, the preset function item (for example, the position marking function item) 1302, a volume button, a pause button, a play button of the smart speaker, and the like.

In this embodiment, the first operation may be a tap operation performed by the user on the preset function item on the control interface (namely, the first interface) of the first home device, for example, a single tap operation.

S1002: The mobile phone 100 sends first prompt information. The first prompt information is used to prompt the user to control the mobile phone 100 to separately point to the first home device in n orientations.

Herein, n≥2, and n is an integer. The mobile phone 100 separately points to the smart speaker in the n orientations, to obtain spatial position information and spatial attitude information of the mobile phone 100 when the mobile phone 100 separately points to the smart speaker in the n orientations. The spatial position information of the mobile phone 100 is a coordinate position of the mobile phone 100 in a UWB coordinate system provided by a UWB base station. The spatial attitude information of the mobile phone 100 includes a pitch angle $\varphi$, a yaw angle $\phi$, and a roll angle $\theta$ of a carrier coordinate system of the mobile phone relative to the UWB coordinate system.

After receiving the first operation, the mobile phone 100 may send the first prompt information in response to the first operation. For example, the first home device is a smart speaker. For example, in response to the first operation, the mobile phone 100 may display a prompt interface shown in FIG. 14. The prompt interface includes first prompt information 1401, for example. "Hold the mobile phone to separately point to the smart speaker in n orientations". Alternatively, the electronic device 100 may send the first prompt information in a manner of playing a voice, for example, "Hold the mobile phone to separately point to the smart speaker in n orientations".

It can be learned from the descriptions that the mobile phone 100 separately points to the smart speaker in the n orientations, to obtain the spatial position information and the spatial attitude information of the mobile phone 100 when the mobile phone 100 separately points to the smart speaker in the n orientations. The mobile phone 100 may interact with the UWB base station in each orientation, to obtain spatial position information of the mobile phone 100 in each orientation. The mobile phone 100 further needs to measure spatial attitude information of the mobile phone 100 when the mobile phone 100 is in each orientation. However, it takes time for the mobile phone 100 to interact with the UWB base station to obtain the spatial position information and for the mobile phone 100 to measure the spatial attitude information of the mobile phone 100.

To ensure that the mobile phone 100 can successfully obtain the spatial position information and the spatial attitude information of the mobile phone 100 when the mobile phone 100 is separately located in the n orientations, the first prompt information may further prompt the user to control the mobile phone 100 to maintain preset duration in each orientation. For example, as shown in FIG. 15, first prompt information 1501 may be "Hold the mobile phone to separately point to the smart speaker in n orientations, and keep the mobile phone in each orientation for at least 5 seconds!"

In some other embodiments, the user may not know how to control the mobile phone 100 to separately point to the smart speaker in the n orientations. In this embodiment, the first prompt information may further prompt the user of a manner in which the user controls the mobile phone 100 to separately point to the smart speaker in the n orientations. The first prompt information may prompt, in a text manner or an image manner, the user to control the mobile phone 100 to separately point to the smart speaker in the n orientations.

Figure 14:
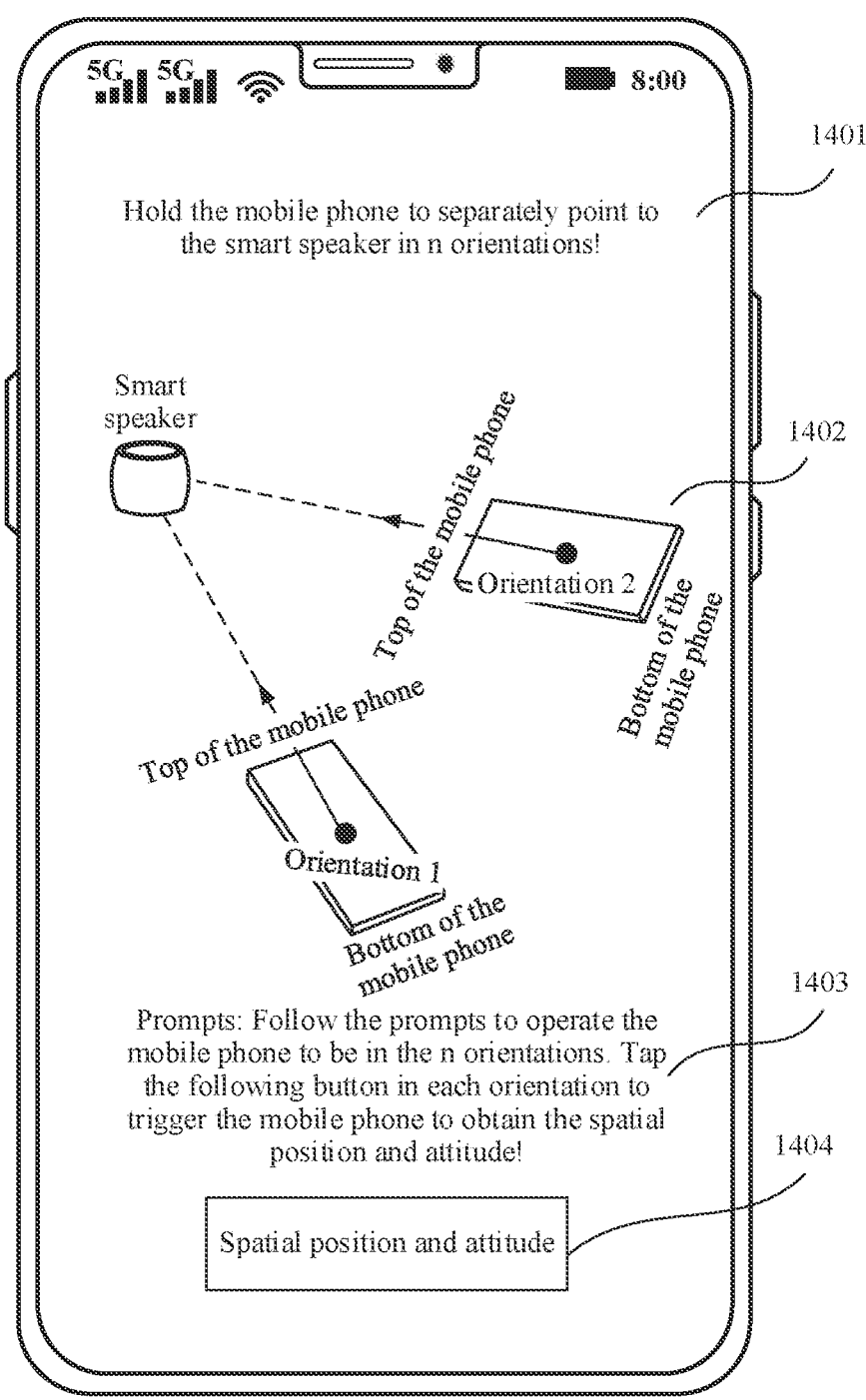
FIG. 14 is a schematic diagram of another display interface of an electronic device according to an embodiment of this application.
Figure 15:
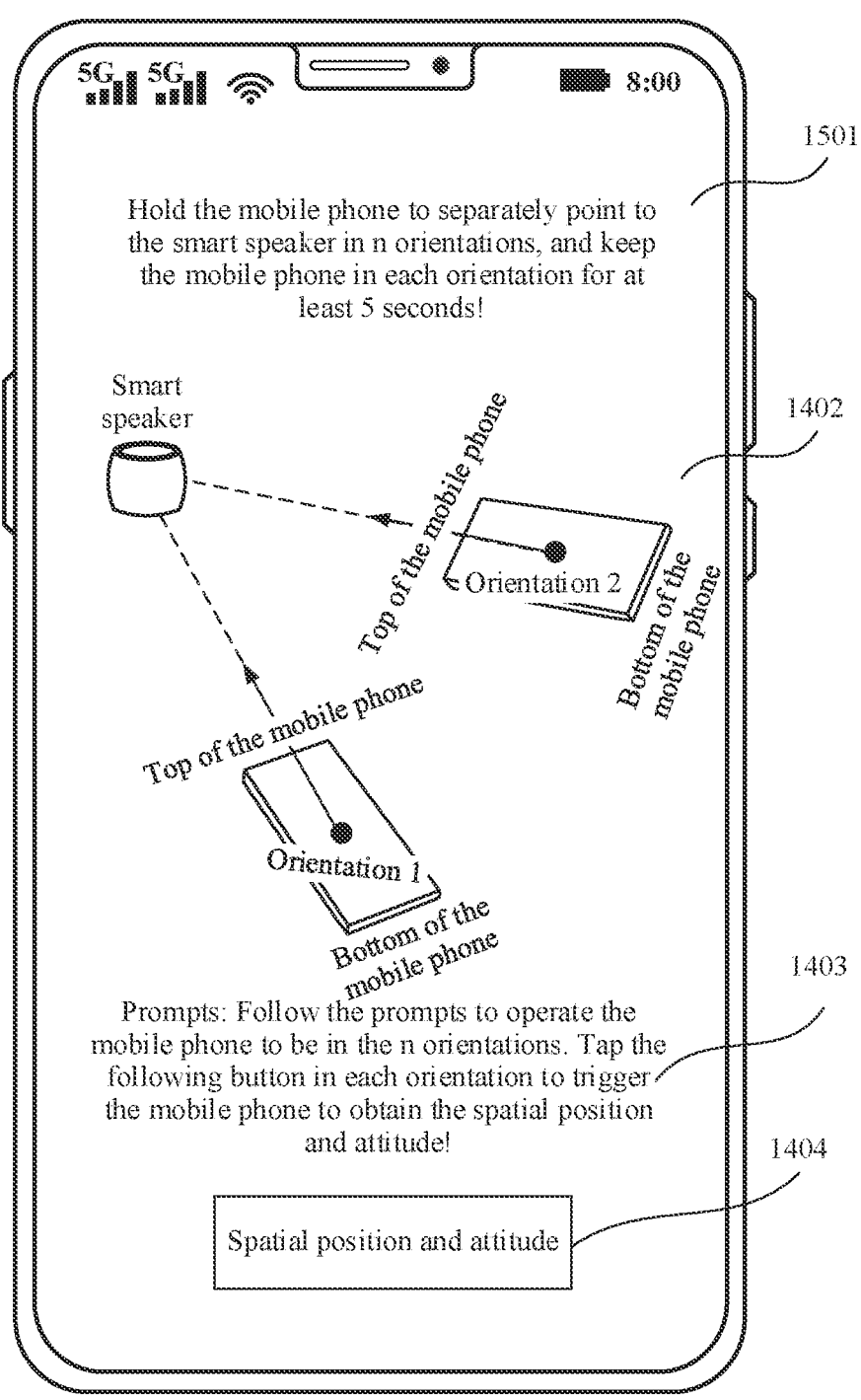
FIG. 15 is a schematic diagram of another display interface of an electronic device according to an embodiment of this application.

For example, the mobile phone may display first prompt information 1402 on the prompt interface shown in FIG. 14 or FIG. 15. The first prompt information 1402 prompts, in the image manner, the user of the manner of controlling the mobile phone to separately point to the smart speaker in the n orientations. For example, the first prompt information 1402 shows the following information: an orientation 1 and an orientation 2; a placement manner of a top and a bottom of the mobile phone 100 relative to the smart speaker when the mobile phone 100 is in the orientation 1; and a placement manner of the top and the bottom of the mobile phone 100 relative to the smart speaker when the mobile phone 100 is in the orientation 2.

It should be noted that S1002 is optional, and all content prompted by the first prompt information when the mobile phone 100 marks the position of the home device may alternatively be described in a specification of the mobile phone 100. The user may control, based on a prompt in the specification, the mobile phone 100 to separately point to the first home device in the n orientations.

S1003: The mobile phone 100 obtains spatial position-attitude information of the mobile phone 100 when the mobile phone 100 is in each of the n orientations. The spatial position-attitude information includes the spatial position information and the spatial attitude information.

In some embodiments, in response to a second operation, the mobile phone 100 may obtain spatial position-attitude information 1 of the mobile phone 100 when the mobile phone 100 is in the orientation 1; and in response to the second operation again, the mobile phone 100 may obtain spatial position-attitude information 2 of the mobile phone 100 when the mobile phone 100 is in the orientation 2.

The second operation may be a tap operation performed by the user on a preset button in the mobile phone 100. For example, the preset button may be a single button or a button combination. Alternatively, the second operation may be a preset operation or a preset gesture performed by the user on the first prompt information. Alternatively, the first prompt information may include a preset control or a preset button, and the second operation may be a tap operation performed by the user on the preset control or the preset button. For example, the prompt interfaces shown in FIG. 14 and FIG. 15 each include a "Spatial position and attitude" button 1404. The second operation may be a tap operation performed by the user on the "Spatial position and attitude" button 1404.

For example, the second operation is the tap operation performed by the user on the "Spatial position and attitude" button 1404. The user may control, based on a prompt of the first prompt information, the mobile phone 100 to be in the orientation 1 shown in FIG. 16. Then, when the mobile phone 100 is in the orientation 1 shown in FIG. 16, the user may tap the "Spatial position and attitude" button 1404 shown in FIG. 14 or FIG. 15. In response to the tap operation (namely, the second operation) performed by the user on the "Spatial position and attitude" button 1404, the mobile phone 100 may obtain spatial position-attitude information 1 of the mobile phone 100 in the orientation 1.

Figure 18:
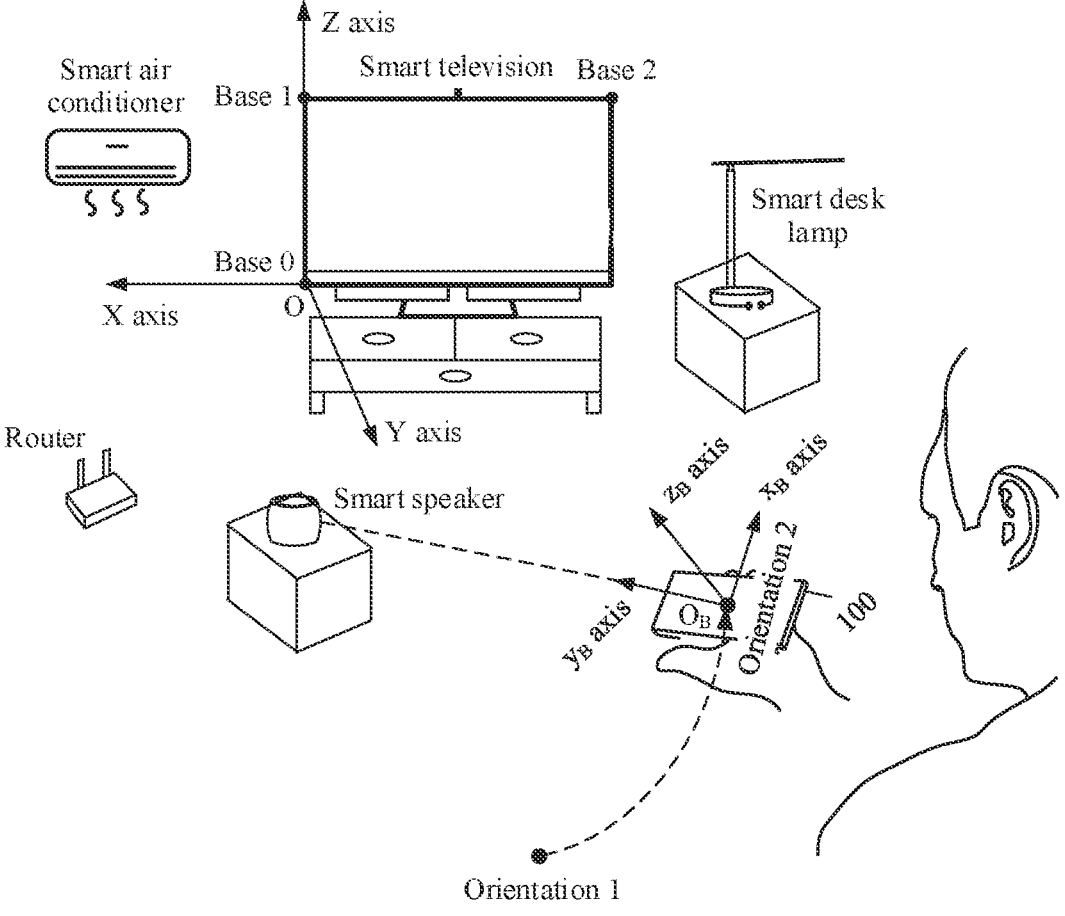
FIG. 18 is a schematic diagram of an application scenario of a home device position marking method according to an embodiment of this application.

Then, the user may control, based on a prompt of the first prompt information, the mobile phone 100 to be in the orientation 2 shown in FIG. 18. Then, when the mobile phone 100 is in the orientation 2 shown in FIG. 18, the user may tap the "Spatial position and attitude" button 1404. In response to the tap operation (namely, the second operation)

performed by the user on the "Spatial position and attitude" button 1404, the mobile phone 100 may obtain spatial position-attitude information 2 of the mobile phone 100 in the orientation 2.

In some other embodiments, after the mobile phone 100 obtains the spatial position-attitude information 1 of the mobile phone 100 in the orientation 1, the mobile phone 100 may send second prompt information. The second prompt information indicates the mobile phone 100 to control the mobile phone to move from the orientation 1 to the orientation 2 and point to the smart speaker in the orientation 2.

Figure 17:
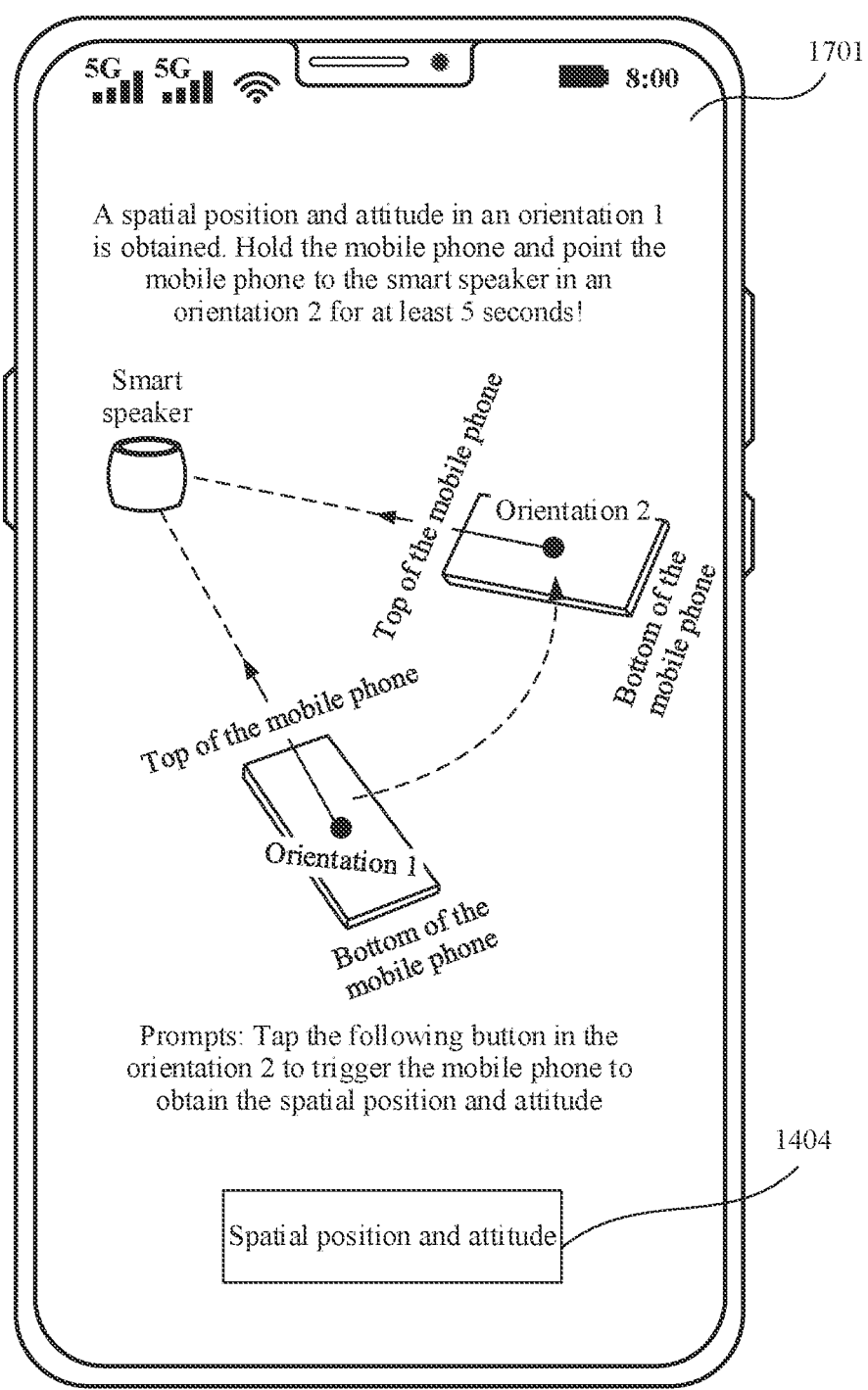
FIG. 17 is a schematic diagram of another display interface of an electronic device according to an embodiment of this application.

For example, after obtaining the spatial position-attitude information 1 of the mobile phone 100 in the orientation 1, the mobile phone 100 may send second prompt information 1701 shown in FIG. 17. The second prompt information 1701 includes the "Spatial position and attitude" button 1404. The user may control, based on a prompt of the second prompt information 1701, the mobile phone 100 to be in the orientation 2 shown in FIG. 18. Then, when the mobile phone 100 is in the orientation 2 shown in FIG. 18, the user may tap the "Spatial position and attitude" button 1404 shown in FIG. 17. In response to the tap operation (namely, the second operation) performed by the user on the "Spatial position and attitude" button 1404, the mobile phone 100 may obtain the spatial position-attitude information 2 of the mobile phone 100 in the orientation 2.

The spatial position-attitude information may include the spatial position information and the spatial attitude information. For example, the spatial position-attitude information 1 may include spatial position information 1 and spatial attitude information 1. The spatial position information 1 is a coordinate position of the mobile phone 100 in the UWB coordinate system provided by the UWB base station when the mobile phone is in the orientation 1. The spatial attitude information 1 of the mobile phone 100 includes a pitch angle $\varphi_1$, a yaw angle $\phi_1$, and a roll angle $\theta_1$ of the carrier coordinate system of the mobile phone 100 relative to the UWB coordinate system when the mobile phone 100 is in the orientation 1.

In this embodiment of this application herein, S1003 is described by using an example in which the mobile phone 100 obtains spatial position-attitude information i (including spatial position information i and spatial attitude information i) of the mobile phone 100 in an orientation i, where i has a value in $\{1, 2, \ldots, n\}$ successively, n≥2, and n is an integer.

In one aspect, the mobile phone 100 may exchange the spatial position information i of the mobile phone 100 in the orientation i with UWB base stations (a base 0, a base 1, and a base 2 shown in FIG. 16) in the orientation i. In another aspect, the mobile phone 100 may measure the spatial attitude information i of the mobile phone 100 in the orientation i by using an IMU chip.

In some embodiments, in response to the second operation, the mobile phone 100 may interact with the base 0, the base 1, and the base 2 in the orientation i, and perform S1003a to S1003c, to obtain the spatial position information i of the mobile phone 100 in the orientation i.

S1003a: The UWB base stations (for example, the base 0, the base 1, and the base 2) each broadcast a first message.

The UWB base station may broadcast the first message by using a UWB chip. The first message may indicate the mobile phone 100 to measure spatial position information i of the mobile phone 100 in a UWB coordinate system constructed by using the three UWB base stations. For example, the base 0, the base 1, and the base 2 shown in FIG. 16 each may broadcast the first message, and the first message indicates the mobile phone 100 to measure the spatial position information 1 of the mobile phone 100 in the UWB coordinate system.

Specifically, the first message may indicate the mobile phone 100 to measure a distance between a UWB base station (for example, a UWB chip of the UWB base station) that broadcasts the first message and the mobile phone 100; and then calculate the spatial position information i of the mobile phone 100 in the UWB coordinate system based on the measured distance.

For example, the first message includes an identifier of the UWB chip of the UWB base station that broadcasts the first message and a first timestamp. An identifier of each UWB chip may uniquely identify the UWB chip, and the first timestamp indicates time at which the UWB base station broadcasts a first message.

Different UWB chips have different identifiers. Therefore, first messages broadcast by UWB chips of different UWB base stations are different. For example, it is assumed that the UWB base station base 0 is a UWB chip A0, the UWB base station base 1 is a UWB chip A1, and the UWB base station base 2 is a UWB chip A2. An identifier of the UWB chip A0 carried in a first message broadcast by the UWB chip A0 (namely, the base 0) may be AH11000000A, an identifier of the UWB chip A1 carried in a first message broadcast by the UWB chip A1 (namely, the base 1) may be AH100000B, and an identifier of the UWB chip A2 carried in a first message broadcast by the UWB chip A2 (namely, the base 2) may be AH100000C. AH100000A, AH100000B, and AH100000C are different.

S1003b: The mobile phone 100 receives a first message from each UWB base station (for example, the base 0, the base 1, and the base 2) in the orientation i, to obtain a distance between the mobile phone 100 and each UWB base station.

The mobile phone 100 is provided with the UWB chip. The mobile phone 100 may receive a first message from any UWB base station (for example, the base 0) by using the UWB chip. Then, the mobile phone may obtain, through calculation according to a UWB distance measurement principle and based on a first message received from a UWB base station (for example, the base 0), a distance between the mobile phone 100 and the UWB base station (for example, the base 0).

Specifically, the first message carries a first timestamp. The first timestamp is used to record time at which the UWB base station (for example, the base 0) broadcasts the first message. When receiving the first message broadcast by the UWB base station (for example, the base 0), the mobile phone may generate a second timestamp. The second timestamp is used to record time at which the mobile phone 100 receives the first message. Then, the mobile phone 100 may obtain, through calculation based on the time recorded in the first timestamp and the second timestamp, duration consumed for transmitting the first message from the UWB base station (for example, the base 0) to the mobile phone 100. Finally, the mobile phone 100 may obtain the distance between the mobile phone 100 and the UWB base station (for example, the base 0) based on a propagation speed (for example, a speed of light) of the first message and the duration consumed for transmitting the first message from the UWB base station (for example, the base 0) to the mobile phone 100.

Figure 16:
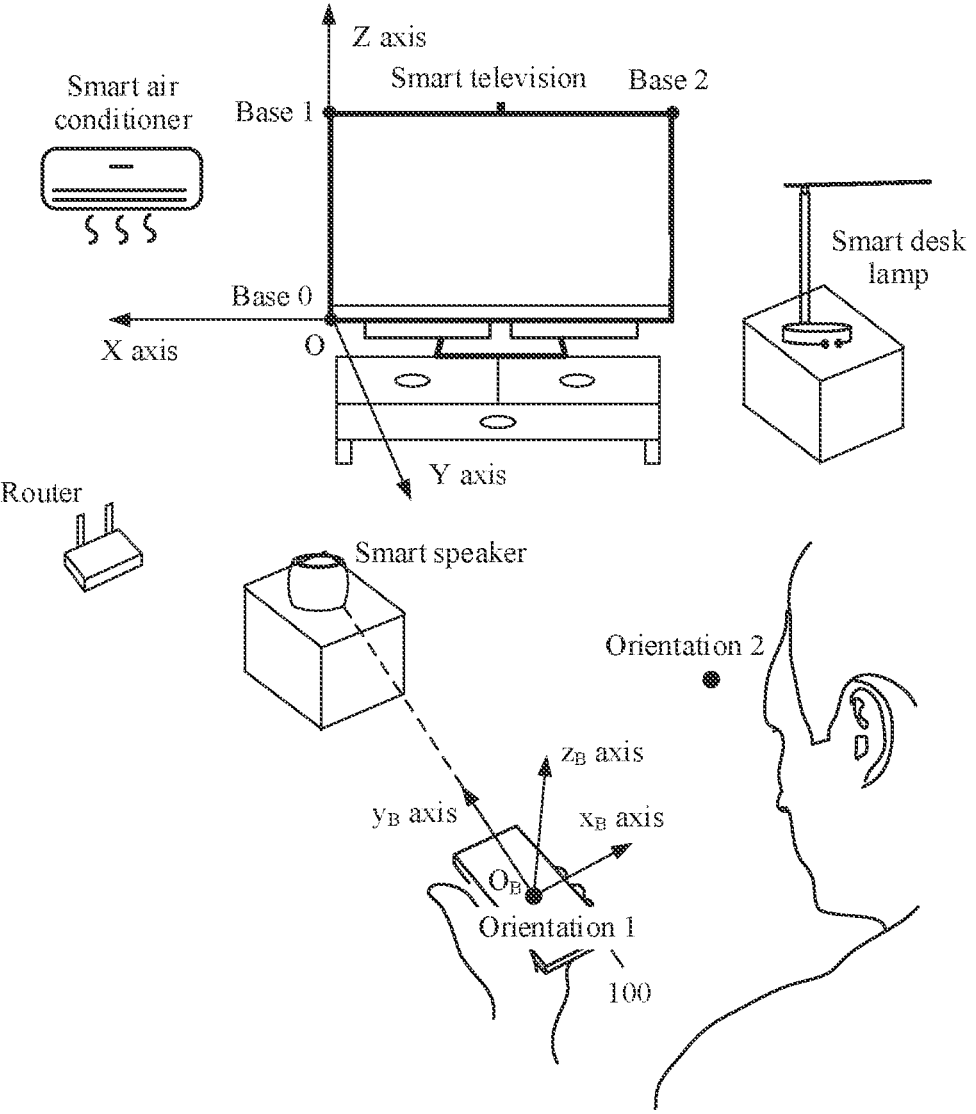
FIG. 16 is a schematic diagram of an application scenario of a home device position marking method according to an embodiment of this application.

For example, Table 1 shows distances, between the mobile phone 100 and UWB base stations (such as the base 0, the base 1, and the base 2) in an application scenario shown in FIG. 16, that are obtained by the mobile phone 100 through calculation.

TABLE 1

| Identifier of a UWB chip | Distance |
|---|---|
| AH100000A (UWB chip $A_0$ of the base 0) | a (length of $OK_i$ shown in FIG. 19) |
| AH100000B (UWB chip $A_1$ of the base 1) | b (length of $PK_i$ shown in FIG. 19) |
| AH100000C (UWB chip $A_2$ of the base 2) | c (length of $QK_i$ shown in FIG. 19) |

Figure 19:
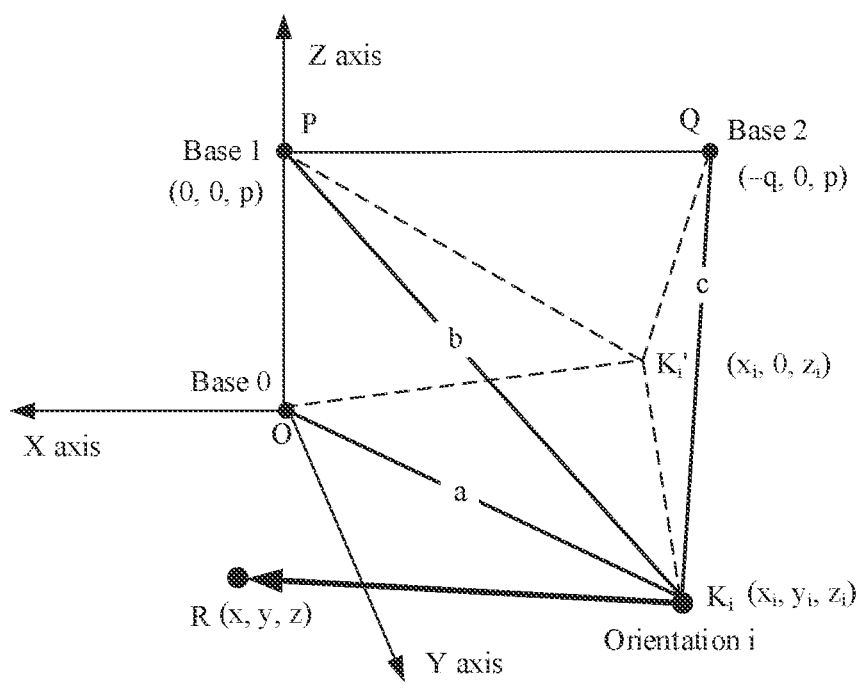
FIG. 19 is a schematic diagram of a principle of calculating spatial position information of an electronic device according to an embodiment of this application.

A point O shown in FIG. 19 is an origin of the UWB coordinate system, and is also a position of the UWB base station the base 0 in the UWB coordinate system A point P is a position of the base 2 in the UWB coordinate system A point Q shown in FIG. 19 is a position of the UWB base station base 1 in the UWB coordinate system. A point $K_i$ shown in FIG. 19 is a position of the mobile phone 100 in the UWB coordinate system when the mobile phone 100 is in the orientation i. $OK_i=a$, $PK_i=b$, $QK_i=c$.

In some other embodiments, after the smart television is powered on, S1003a may be performed; and after the mobile phone 100 is powered on, S1003b may be performed. The mobile phone 100 may store a correspondence between an identifier of a UWB chip and a distance shown in Table 1 by performing S1003b. In this way, in response to the second operation, the mobile phone 100 may obtain, based on an identifier of a UWB base station, a distance between the mobile phone 100 and a UWB base station corresponding to the identifier of the UWB chip. Then, the mobile phone 100 may perform S1003 to calculate the spatial position information i of the mobile phone 100 in the UWB coordinate system.

S1003c: The mobile phone 100 calculates the spatial position information i of the mobile phone 100 in the UWB coordinate system based on the distance between the mobile phone 100 and each UWB base station.

For example, in this embodiment of this application, with reference to FIG. 19, a specific method for calculating the spatial position information i of the mobile phone 100 in the UWB coordinate system by the mobile phone 100 is described. As shown in FIG. 19, it is assumed that when the mobile phone 100 is in the orientation i, coordinates of the mobile phone 100 in the UWB coordinate system are $K_i$ ($x_i$, $y_i$, $z_i$). Coordinates of the point O, the point P. and the point Q in the UWB coordinate system are respectively O (0, 0, 0), P (0, 0, p) and Q (−q, 0, p). PQ=q, and q is a length of a display of the smart television. OP=p, and p is a width (also referred to as a height) of the display of the smart television. In some embodiments, the first message may further include coordinates of the UWB base station in the UWB coordinate system. For example, the first message broadcast by the base 0 further includes the coordinates O (0, 0, 0), the first message broadcast by the base 1 further includes the coordinates P (0, 0, p), and the first message broadcast by the base 2 further includes the coordinates Q (−q, 0, p).

A point $K_i'$ shown in FIG. 19 is a vertical projection of the point $K_i$ on an OPQ plane (namely, an XOZ plane), and coordinates of $K_i'$ are ($x_i$, 0, $z_i$). Therefore, $K_iK_i'$ is perpendicular to the OPQ plane (namely, the XOZ plane), $K_iK_i'$ is perpendicular to the $PK_i'$, $K_iK_i'$ is perpendicular to the $QK_i'$, and $K_iK_i'$ is perpendicular to the $OK$. In this way, the following formula (1) to formula (3) may be obtained according to the Pythagorean theorem:

$$K_iK_i'^2+QK_i'^2=QK_i^2 \qquad \text{Formula (1)};$$

$$K_iK_i'^2+PK_i'^2=PK_i^2 \qquad \text{Formula (2)}$$

$$K_iK_i'^2+OK_i'^2=OK_i^2 \qquad \text{Formula (3)}$$

$K_iK_i'=y_i$, $QK_i=c$, $QK_i'=\sqrt{(-q-x_i)^2+(p-z_i)^2}$, and the following formula (4) may be obtained according to the formula (1); $PK_i=b$, $PK_i'=\sqrt{x_i^2+(p-z_i)^2}$, and the following formula (5) may be obtained according to the formula (2); and $OK_i=a$, $OK_i'=\sqrt{x_i^2+z_i^2}$, and the following formula (6) may be obtained according to the formula (3):

$$y_i^2+c^2=(-q-x_i)^2+(p-z_i)^2 \qquad \text{Formula (4)};$$

$$y_i^2+b^2=x_i^2+(p-z_i)^2 \qquad \text{Formula (5)}$$

$$y_i^2+a^2=x_i^2+z_i^2 \qquad \text{Formula (6)}.$$

Then, the mobile phone 100 may obtain the spatial position information 1 of the mobile phone 100 in the orientation 1, namely, the coordinates $K_i$ ($x_i$, $y_i$, $z_i$) of the mobile phone 100 in the UWB coordinate system, through calculation according to the formula (4), the formula (5), and the formula (6). A specific method for calculating $x_i$, $y_i$, and $z_i$ by the mobile phone 100 according to the formula (4), formula (5), and the formula (6) and calculation results are not described in this embodiment of this application.

It should be noted that a method for calculating the spatial position information i of the mobile phone 100 in the UWB coordinate system by the mobile phone 100 includes but is not limited to the method in the foregoing embodiment. The mobile phone 100 may alternatively calculate the spatial position information i of the mobile phone 100 in the UWB coordinate system in another manner. This is not limited in this embodiment of this application.

Figure 20:
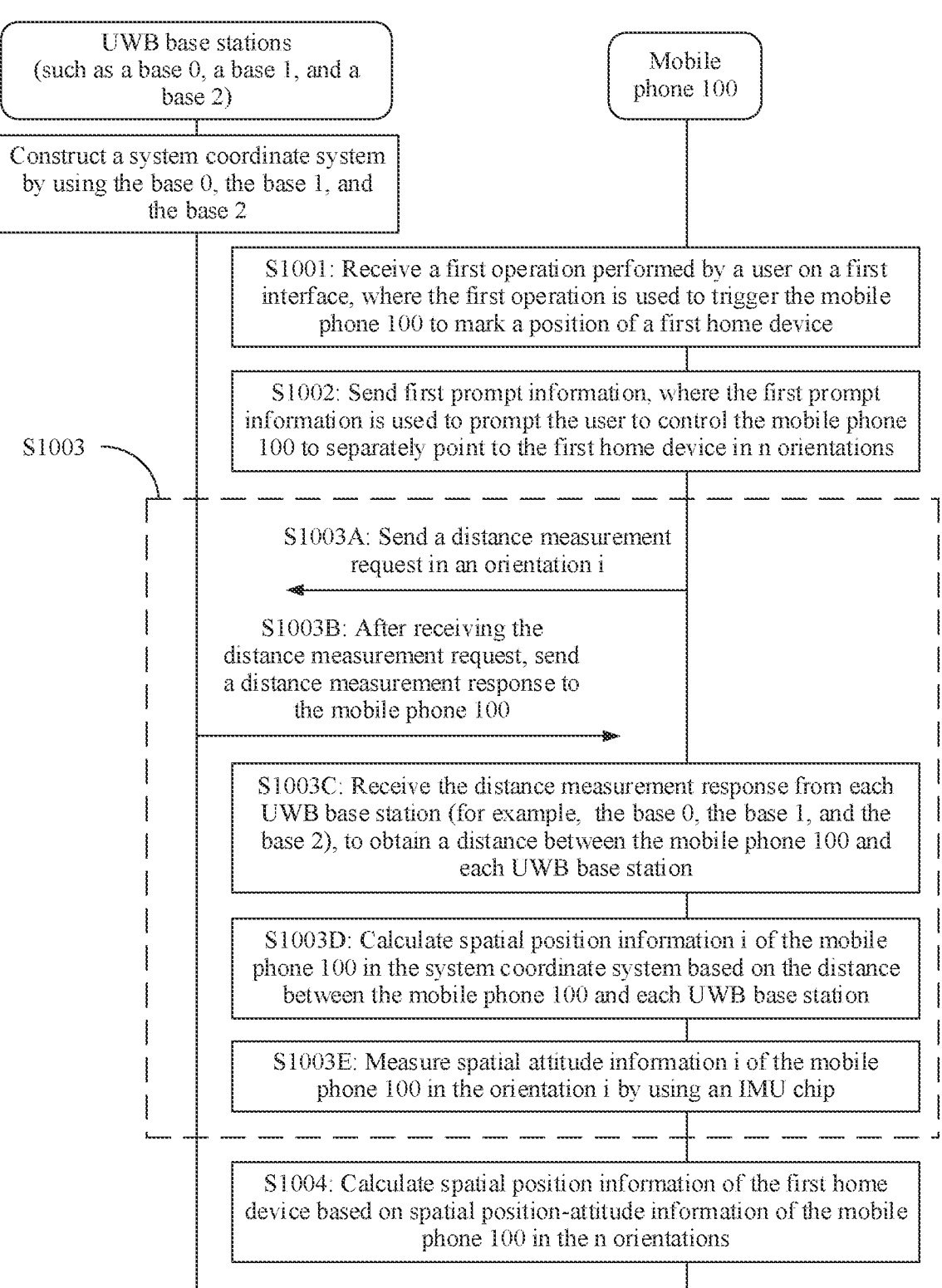
FIG. 20 is a flowchart of another home device position marking method according to an embodiment of this application.

In some other embodiments, in response to the second operation, the mobile phone 100 may actively send a distance measurement request to the UWB base station, to measure a distance between the mobile phone 100 and the UWB base station. Specifically, in response to the second operation, the mobile phone 100 may interact with the base 0, the base 1, and the base 2 in the orientation i, and perform S1003A to S1003D, to obtain the spatial position information i of the mobile phone 100 in the orientation i, where i has a value in {1, 2, . . . , n} successively, n≥2, and n is an integer. As shown in FIG. 20. S1003 may include S1003A to S1003D.

S1003A: The mobile phone 100 sends the distance measurement request to the UWB base station (for example, the base 0, the base 1, and the base 2) in the orientation i.

The distance measurement request is used to request to measure the distance between the mobile phone 100 and the UWB base station. The distance measurement request may further include an identifier of the UWB chip of the mobile phone 100. For example, the mobile phone 100 may broadcast the distance measurement request in response to the second operation. In this way, each UWB base station (such as the base 0, the base 1, and the base 2) can receive the distance measurement request.

S1003B: After receiving the distance measurement request, the UWB base station (for example, the base 0, the base 1, and the base 2) sends a distance measurement response to the mobile phone 100.

In some embodiments, the UWB base station may broadcast the distance measurement response. The distance measurement response includes an identifier of a UWB chip of the UWB base station that sends the distance measurement response. The distance measurement response may further include a first timestamp, and the first time stamp indicates time at which the UWB base station (for example, the base 0) sends the distance measurement response.

In some other embodiments, the distance measurement response may further include the identifier of the UWB chip of the mobile phone 100 that receives the distance measurement response. The identifier of the mobile phone 100 in the distance measurement response indicates that a destination end of the distance measurement response is the mobile phone 100.

S1003C: The mobile phone 100 receives the distance measurement response from each UWB base station (for example, the base 0, the base 1, and the base 2), to obtain a distance between the mobile phone 100 and each UWB base station.

S1003D: The mobile phone 100 calculates the spatial position information i of the mobile phone 100 in the UWB coordinate system based on the distance between the mobile phone 100 and each UWB base station.

For detailed descriptions of S1003C and S1003D, refer to the descriptions of S1003*b* and S1003*c* in the foregoing embodiment. Details are not described herein again in this embodiment of this application. As shown in FIG. 20, S1003 may further include S1003E.

S1003E: The mobile phone 100 measures the spatial attitude information i of the mobile phone 100 in the orientation i by using the IMU chip.

It should be noted that a specific method for obtaining, by the mobile phone 100, spatial position-attitude information of the mobile phone 100 in an orientation includes but is not limited to the method in the foregoing embodiment. Any method for obtaining the spatial position-attitude information of the mobile phone 100 in the UWB coordinate system is applicable to the method in embodiments of this application.

S1004: The mobile phone 100 calculates the spatial position information of the first home device based on the spatial position-attitude information of the mobile phone 100 in the n orientations.

The spatial position-attitude information of the mobile phone 100 may include the spatial position information and the spatial attitude information. For example, the spatial position information of the mobile phone 100 in the orientation i is $(x_i, y_i, z_i)$, and the spatial attitude information of the mobile phone 100 in the orientation i includes a pitch angle $\varphi_i$, a yaw angle $\phi_i$, and a roll angle $\theta_i$ of the carrier coordinate system of the mobile phone 100 relative to the UWB coordinate system, where i has a value in $\{1, 2, \ldots, n\}$ successively. $n \geq 2$, and n is an integer.

For example, when the mobile phone 100 is in the orientation 1 shown in FIG. 18, a coordinate position of the mobile phone 100 in the UWB coordinate system is $(x_i, y_i, z_i)$, and the spatial attitude information of the mobile phone 100 includes the pitch angle $\varphi_1$, the yaw angle $\phi_1$, and the roll angle $\theta_1$. When the mobile phone 100 is in the orientation 2 shown in FIG. 18, a coordinate position of the mobile phone 100 in the UWB coordinate system is $(x_2, y_2, z_2)$, and the spatial attitude information of the mobile phone 100 includes a pitch angle $\varphi_2$, a yaw angle $\phi_2$, and a roll angle $\theta_2$.

In other words, when the mobile phone 100 is in the orientation i, a coordinate position of the mobile phone 100 in the UWB coordinate system is $(x_i, y_i, z_i)$, and the spatial attitude information is the pitch angle $\varphi_i$, the yaw angle $\phi_i$, and the roll angle $\theta_i$, where i has a value in $\{1, 2, \ldots, n\}$ successively, $n \geq 2$, and n is an integer. In the following embodiments, an example in which when the mobile phone 100 is in the orientation i, the spatial position information of the mobile phone 100 is $(x_i, y_i, z_i)$, and the spatial attitude information is the pitch angle $\varphi_i$, the yaw angle $\phi_i$, and the roll angle $\theta_i$ is used to describe a specific method in which the mobile phone 100 performs S1004 to calculate the spatial position information (x, y, z) of the first home device (for example, the smart speaker).

The spatial position information $(x_i, y_i, z_i)$ and the spatial attitude information (including the pitch angle $\varphi_i$, the yaw angle $\phi_i$, and the roll angle $\theta_i$) of the mobile phone 100 are known quantities, and the spatial position information (x, y, z) of the smart speaker is an unknown quantity, where i has a value in $\{1, 2, \ldots, n\}$ successively, $n \geq 2$, and n is an integer.

It should be understood that the spatial position information (x, y, z) of the smart speaker is a coordinate position of the smart speaker in the UWB coordinate system, and (x, y, z) may be represented by a matrix of three rows and one column shown by a matrix (1). The spatial position information $(x_i, y_i, z_i)$ of the mobile phone 100 is the coordinate position of the mobile phone 100 in the UWB coordinate system, and $(x_i, y_i, z_i)$ may be represented by a matrix of three rows and one column shown by a matrix (2).

$$\begin{bmatrix} x \\ y \\ z \end{bmatrix}_e \qquad \text{Matrix (1)}$$

$$\begin{bmatrix} x_i \\ y_i \\ z_i \end{bmatrix}_e \qquad \text{Matrix (2)}$$

Therefore, as shown in a formula (8), the matrix (1)—the matrix (2), so that a vector $K_iR$ shown in FIG. 19 may be obtained.

$$\text{Vector } K_iR = \begin{bmatrix} x \\ y \\ z \end{bmatrix}_e - \begin{bmatrix} x_i \\ y_i \\ z_i \end{bmatrix}_e \qquad \text{Formula (7)}$$

The point $K_i$ is a position of the mobile phone 100 in the orientation i, and coordinates of $K_i$ are $(x_i, y_i, z_i)$. A point R is a position of the smart speaker, coordinates of R are (x, y, z). A subscript e in each of the matrix (1) and the matrix (2) represents the UWB coordinate system constructed by using the UWB base stations, and $K_i(x_i, y_i, z_i)$ and R (x, y, z) are coordinates in the UWB coordinate system. In addition, $(x_i, y_i, z_i)$ is a known quantity, and (x, y, z) is an unknown quantity.

The user operates the mobile phone 100 to sequentially rotate around a pitch axis (namely, an $x_B$ axis), a roll axis (namely, an $y_B$ axis), and a yaw axis (namely, an $z_B$ axis) of the carrier coordinate system in a fixed sequence based on the pitch angle $\varphi_i$, the yaw angle $\phi_i$, and the roll angle $\theta_i$, so that the three axes of the carrier coordinate system are respectively parallel to the three axes of the UWB coordinate system.

In this embodiment of this application, when the three axes of the carrier coordinate system are respectively parallel to the three axes of the UWB coordinate system, a spatial attitude of the mobile phone 100 may be referred to as a preset initial attitude. When the mobile phone 100 is in the preset initial attitude, in the spatial attitude information of the mobile phone 100, a pitch angle $\varphi_0=0°$, a yaw angle $\phi_0=0°$, and a roll angle $\theta_0=0°$).

Specifically, when the mobile phone 100 is in a spatial attitude (referred to as an actual spatial attitude) corresponding to the pitch angle $\varphi_i$, the yaw angle $\phi_i$, and the roll angle $\theta_i$, the mobile phone 100 sequentially rotates $\varphi_i$ around the pitch axis (namely, the $x_B$ axis) of the carrier coordinate system, rotates $\theta_i$ around the roll axis (namely, the $y_B$ axis), and rotates $\phi_i$ around the yaw axis (namely, the $z_B$ axis) in the fixed sequence, so that the mobile phone 100 may be changed from the actual spatial attitude to the preset initial attitude.

It should be noted that the fixed sequence may be: first rotating $\varphi_i$ around the $x_B$ axis, then rotating $\theta_i$ around the $y_B$ axis, and finally rotating $\phi_i$ around the $z_B$ axis; first rotating $\theta_i$ around the $y_B$ axis, then rotating $\varphi_i$ around the $x_B$ axis, and finally rotating $\phi_i$ around the $z_B$ axis; first rotating $\phi_i$ around the $z_B$ axis, then rotating $\theta_i$ around the $y_B$ axis, and finally rotating $\varphi_i$ around the $x_B$ axis; or the like. The fixed sequence is not limited in this embodiment of this application.

For example, in this embodiment of this application, the fixed sequence is first rotating $\phi_i$ around the $z_B$ axis, then rotating $\varphi_i$ around the $x_B$ axis, and finally rotating $\theta_i$ around the ye axis. The following $C_b^{e(i)}$ is a rotation matrix obtained when the mobile phone 100 rotates around the three axes of the carrier coordinate system in the sequence to transform from the actual spatial attitude to the preset initial attitude. In the preset rotation matrix $C_b^{e(i)}$, a subscript b represents the carrier coordinate system of the mobile phone 100, and a superscript e represents the UWB coordinate system constructed by using the UWB base stations. The preset rotation matrix $C_b^{e(i)}$ is shown in the formula (8):

$$C_b^{e(i)} = \begin{bmatrix} \cos\theta_i\cos\phi_i - \sin\varphi_i\sin\theta_i\sin\phi_i & -\cos\varphi_i\sin\phi_i & \sin\theta_i\cos\phi_i + \sin\varphi_i\cos\theta_i\sin\phi \\ \cos\theta_i\cos\phi_i + \sin\varphi_i\sin\theta_i\sin\phi_i & -\cos\varphi_i\cos\phi_i & \sin\theta_i\sin\phi_i + \sin\varphi_i\cos\theta_i\sin\phi_1 \\ -\cos\varphi_i\sin\theta_i & \sin\varphi_i & \cos\varphi_i\cos\theta \end{bmatrix}$$
Formula (8)

$C_b^{e(i)}$ is obtained by using the following three rotation matrices: a rotation matrix (1) to a rotation matrix (3).

$$C(z_B, \phi_i) = \begin{bmatrix} \cos\phi_i & -\sin\phi_i & 0 \\ \sin\phi_i & \cos\phi_i & 0 \\ 0 & 0 & 1 \end{bmatrix};$$
Rotation matrix (1)

$$C(z_B, \varphi_i) = \begin{bmatrix} 1 & 0 & 0 \\ 0 & \cos\varphi_i & -\sin\varphi_i \\ 0 & \sin\varphi_i & \cos\varphi_i \end{bmatrix}$$
Rotation matrix (2)

$$C(y_B, \theta_i) = \begin{bmatrix} \cos\theta_i & 0 & \sin\theta_i \\ 0 & 1 & 0 \\ -\sin\theta_i & 0 & \cos\theta_i \end{bmatrix}$$
Rotation C ($z_B$, $\phi_i$) is a rotation matrix in which the mobile phone 100 rotates $\phi_i$ around the $z_B$ axis of the carrier coordinate system b, C ($x_B$, $\varphi_i$) is a rotation matrix in which the mobile phone 100 rotates $\varphi_i$ around the $x_B$ axis of the carrier coordinate system b, and C ($y_B$, $\theta_i$) is a rotation matrix in which the mobile phone 100 rotates $\theta_i$ around the $y_B$ axis of the carrier coordinate system b.

$C_b^{e(i)}$=C ($z_B$, $\phi_i$)×C ($x_B$, $\varphi_i$)×C ($y_B$, $\theta_i$). It should be understood that $C_b^{e(i)}$ may also be referred to as a coordinate conversion matrix between the carrier coordinate system b and the UWB coordinate system e. By using $C_b^{e(i)}$, a coordinate parameter (for example, a vector) in the carrier coordinate system b may be converted into a coordinate parameter (for example, a vector) in the UWB coordinate system e.

Therefore, the following formula (9) may be obtained according to a coordinate system transfer principle:

$$\text{Vector } K_iR = C_b^{e(i)} \cdot \begin{bmatrix} 0 \\ r_i \\ 0 \end{bmatrix}_b = \begin{bmatrix} (-\cos\varphi_i\sin\phi_i) \times r_i \\ (-\cos\varphi_i\cos\phi_i) \times r_i \\ \sin\varphi_i \times r_i \end{bmatrix}$$
Formula (9)

Herein, $r_i=K_iR$, and $K_iR$ is a distance between the mobile phone 100 and the smart speaker when the mobile phone 100 is in the orientation i. When the mobile phone 100 points to the smart speaker in the orientation i, the $y_B$ axis of the carrier coordinate system b of the mobile phone 100 passes through the position of the smart speaker. Therefore, coordinates of the smart speaker in the carrier coordinate system b are (0, $r_i$, 0). The matrix $$\begin{bmatrix} o \\ r_i \\ 0 \end{bmatrix}_b$$

is obtained by using the coordinates (0, $r_i$, 0) of the smart speaker in the carrier coordinate system b. Herein, $r_i$ is a modulus of the vector $K_iR$, namely, a length of the vector $K_iR$. The vector $K_iR$ is a vector in the UWB coordinate system e. It should be further noted that ($x_i$, $y_i$, $z_i$), the pitch angle $\varphi_i$, the yaw angle $\phi_i$, and the roll angle $\theta_i$ are all known quantities, and (x, y, z) and $r_i$ are all unknown quantities.

With reference to the formula (7) and the formula (9), the following formula (10) may be obtained, so as to obtain a formula (11):

$$\begin{bmatrix} x \\ y \\ z \end{bmatrix}_e - \begin{bmatrix} x_i \\ y_i \\ z_i \end{bmatrix}_e = C_b^{e(i)} \cdot \begin{bmatrix} 0 \\ r_i \\ 0 \end{bmatrix}_b$$
Formula (10)

$$\begin{bmatrix} x \\ y \\ z \end{bmatrix}_e - \begin{bmatrix} (-\cos\varphi_i\sin\phi_i) \times r_i \\ (-\cos\varphi_i\cos\phi_i) \times r_i \\ \sin\varphi_i \times r_i \end{bmatrix} = \begin{bmatrix} x_i \\ y_i \\ z_i \end{bmatrix}_e$$
Formula (11)

$$(-\cos\varphi_i\sin\phi_i) \times r_i \text{ in } \begin{bmatrix} (-\cos\varphi_i\sin\phi_i) \times r_i \\ (-\cos\varphi_i\cos\phi_i) \times r_i \\ \sin\varphi_i \times r_i \end{bmatrix}$$

in the formula (11) is a product of an element in a first row and a second column of $C_b^{e(i)}$ in the formula (8) and $r_i$, and may be represented by $C_b^{e(i)}(1, 2) \times r_i$.

Similarly, ($-\cos \varphi_i \cos \phi_i$)×$r_i$ in the formula (11) is a product of an element in a second row and the second column of $C_b^{e(i)}$ in the formula (8) and $r_i$, and may be represented by $C_b^{e(i)}(2, 2) \times r_i$. $\sin \varphi_i \times r_i$ in the formula (11) is a product of an element in a third row and the second column of $C_b^{e(i)}$ in the formula (8) and $r_i$, and may be represented by $C_b^{e(i)} (3, 2) \times r_i$.

In other words. $C_b^{e(i)}(1,2)=-\cos \varphi_i \sin \phi_i$, $C_b^{e(i)}(2,2)=-\cos \varphi_i \cos \phi$, and $C_b^{e(i)}(3, 2)=\sin \varphi_i$. Therefore, the formula (1) may be transformed into the following formula (12):

$$\begin{bmatrix} x \\ y \\ z \end{bmatrix}_e - \begin{bmatrix} C_b^{e(i)}(1,2) \times r_i \\ C_b^{e(i)}(2,2) \times r_i \\ C_b^{e(i)}(3,2) \times r_i \end{bmatrix} = \begin{bmatrix} x_i \\ y_i \\ z_i \end{bmatrix}_e \qquad \text{Formula (12)}$$

It can be learned from the formula (12), $x-C_b^{e(i)}(1,2)\times r_i=x_i$, $y-C_b^{e(i)}(2,2)\times r_i=y_i$, and $z-C_b^{e(i)}(3,2)\times r_i=z_i$.

According to the formula (12), with reference to n pieces of spatial attitude information of the mobile phone 100 that are obtained by the mobile phone 100 through measurement in the n orientations, the following matrix equation (1) may be obtained:

$$AX = B \qquad \text{Matrix equation (1)}$$

$$A = \begin{bmatrix} 1 & 0 & 0 & C_b^{e(1)}(1,2) & \dots & 0 \\ 0 & 1 & 0 & C_b^{e(1)}(2,2) & \dots & 0 \\ 0 & 0 & 1 & C_b^{e(1)}(3,2) & \dots & 0 \\ \dots & \dots & \dots & \dots & \dots & \dots \\ 1 & 0 & 0 & 0 & \dots & C_b^{e(n)}(1,2) \\ 0 & 1 & 0 & 0 & \dots & C_b^{e(n)}(1,2) \\ 0 & 0 & 1 & 0 & \dots & C_b^{e(n)}(1,2) \end{bmatrix},$$

$$X = \begin{bmatrix} x \\ y \\ z \\ -r_1 \\ \dots \\ -r_n \end{bmatrix}, \text{ and } B = \begin{bmatrix} x_1 \\ y_1 \\ z_1 \\ \dots \\ x_n \\ y_n \\ z_n \end{bmatrix}$$

The mobile phone 100 may resolve the matrix equation (1) by using a formula $X=(A^TA)^{-1}A^TB$, where $A^T$ is a transposition matrix of A, $A^T=$ $$\begin{bmatrix} 1 & 0 & 0 & \dots & 1 & 0 & 0 \\ 0 & 1 & 0 & \dots & 0 & 1 & 0 \\ 0 & 0 & 1 & \dots & 0 & 0 & 1 \\ C_b^{e(1)}(1,2) & C_b^{e(1)}(2,2) & C_b^{e(1)}(3,2) & \dots & 0 & 0 & 0 \\ \dots & \dots & \dots & \dots & \dots & \dots & \dots \\ 0 & 0 & 0 & \dots & C_b^{e(n)}(1,2) & C_b^{e(n)}(2,2) & C_b^{e(n)}(3,2) \end{bmatrix},$$

$A^TA$ indicates a product of $A^T$ and A, $(A^TA)^{-1}$ is an inverse matrix of $A^TA$, and X is equal to the inverse matrix of $A^TA$ multiplied by $A^T$ and then by B.

The mobile phone 100 may obtain a matrix X namely, $$\begin{bmatrix} x \\ y \\ z \\ -r_1 \\ \dots \\ -r_n \end{bmatrix},$$

through calculation by using $X=(A^TA)^{-1}A^TB$. In other words, the mobile phone 100 may calculate the coordinates R (x, y, z) of the first home device (for example, the smart speaker) in the UWB coordinate system. In this way, the mobile phone 100 may complete position marking of the home device.

Figure 21:
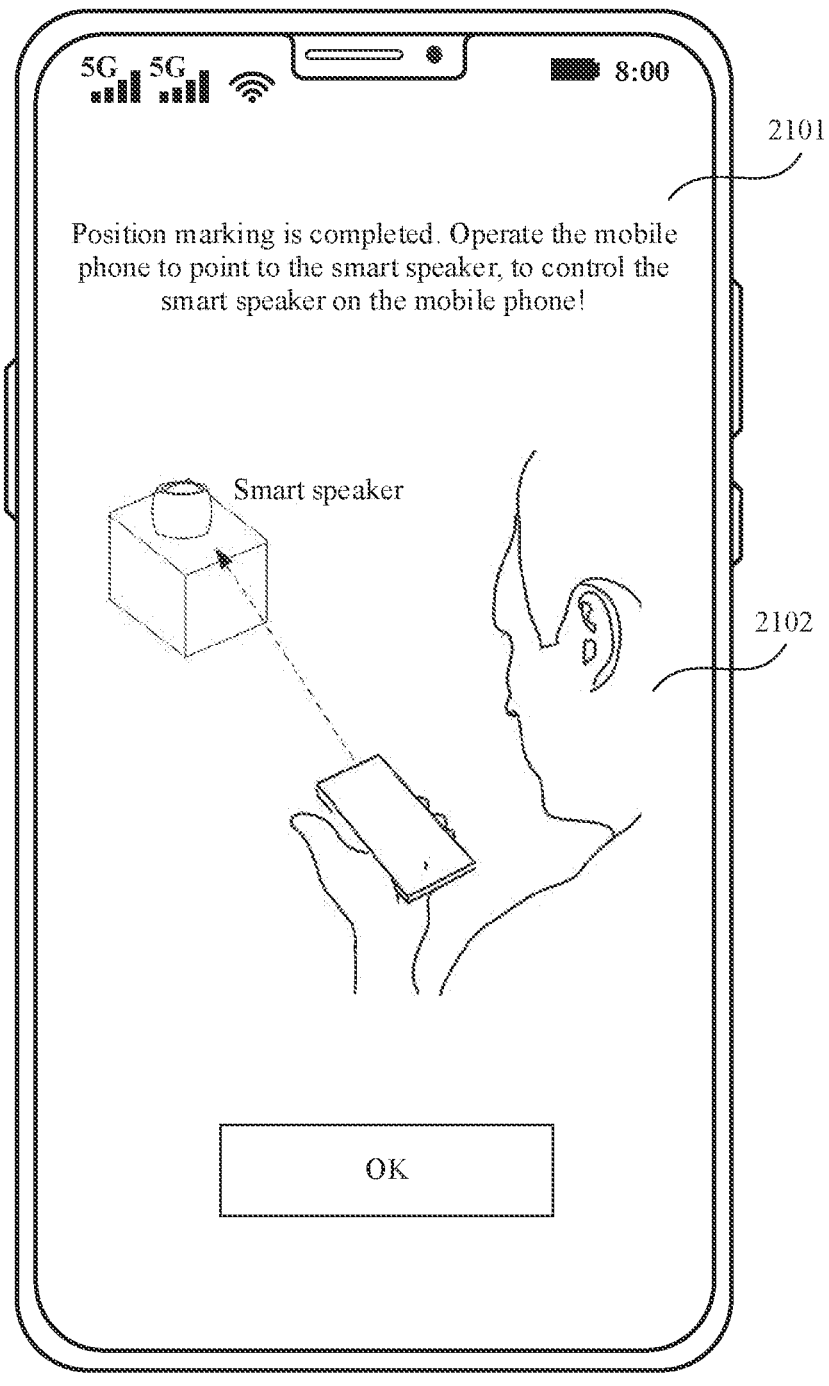
FIG. 21 is a schematic diagram of another display interface of an electronic device according to an embodiment of this application.

In some other embodiments, after obtaining the spatial position information of the first home device (for example, the smart speaker), the mobile phone 100 may further send third prompt information, where the third prompt information is used to prompt the user that position marking of the first home device is completed, and the user may control the first home device by operating the mobile phone 100 to point to the first home device. For example, the mobile phone 100 may send third prompt information 2101 shown in FIG. 21, for example, "Position marking is completed. Operate the mobile phone to point to the smart speaker, to control the smart speaker on the mobile phone!" Optionally, the mobile phone 100 may further display an image 2102 in which the mobile phone 100 points to the smart speaker. In response to a tap operation performed by the user on an "OK" button shown in FIG. 21, the mobile phone 100 may display a home screen or the home page of the smart home app.

In some embodiments, after S1004, the mobile phone 100 may perform S1005. S1005: The mobile phone 100 stores the spatial position information of the first home device. It should be understood that the mobile phone 100 may directionally control the smart speaker based on the spatial position information of the first home device (for example, the smart speaker). For example, when the user operates the mobile phone 100 to point to the position of the smart speaker shown in FIG. 1, the mobile phone 100 may automatically display the control interface 201 of the smart speaker shown in FIG. 2, so that the user operates and controls the smart speaker.

In conclusion, according to the method in embodiments of this application, even if no UWB chip is configured for the home device (for example, the smart speaker), the mobile phone 100 may still mark the position of the home device by pointing to the home device at a plurality of positions.

In addition, when the method in embodiments of this application is used to mark the position of the home device, accuracy of position marking is not affected by signal strength of the UWB base station. In other words, according to this solution, accuracy of marking the position of the home device by the mobile phone 100 can be further improved, thereby improving positioning accuracy when the mobile phone 100 directionally controls the home device.

In some cases, because the spatial position-attitude information i of the mobile phone 100 is inaccurate, calculation precision of the spatial position information of the first home device (for example, the smart speaker) obtained by the mobile phone 100 through calculation is low. If the calculation precision of the spatial position information of the smart speaker is low, the mobile phone 100 cannot directionally control the smart speaker. Therefore, before performing S1005 to store the spatial position information of the first home device, the mobile phone 100 may perform precision determining on the spatial position information, to determine whether the calculation precision of the spatial position information meets a precision requirement. Specifically, before S1005, the method in embodiments of this application may further include S1005'. As shown in FIG. 22, the method in embodiments of this application may further include S1005' and S1005.

S1005': The mobile phone 100 determines whether a calculation error of the spatial position information of the first home device is less than a preset error threshold.

For example, the mobile phone 100 may calculate a residual G of AX−B in the matrix equation (1). A modulus of the residual G may be used as the calculation error of the spatial position information of the first home device. Then, the mobile phone 100 may determine whether the modulus of the residual k is less than the preset error threshold. A smaller calculation error of the spatial position information indicates higher calculation precision of the spatial position information, and a larger calculation error of the spatial position information indicates lower calculation precision of the spatial position information.

The residual $G =$ $$AX - B = \begin{bmatrix} x - C_b^{e(1)}(1,2) \times r_1 \\ y - C_b^{e(1)}(2,2) \times r_1 \\ z - C_b^{e(1)}(3,2) \times r_1 \\ \cdots \\ x - C_b^{e(n)}(1,2) \times r_n \\ y - C_b^{e(n)}(2,2) \times r_n \\ z - C_b^{e(n)}(3,2) \times r_n \end{bmatrix} - \begin{bmatrix} x_1 \\ y_1 \\ z_1 \\ \cdots \\ x_n \\ y_n \\ z_n \end{bmatrix} = \begin{bmatrix} x - C_b^{e(1)}(1,2) \times r_1 - x_1 \\ y - C_b^{e(1)}(2,2) \times r_1 - y_1 \\ z - C_b^{e(1)}(3,2) \times r_1 - z_1 \\ \cdots \\ x - C_b^{e(n)}(1,2) \times r_n - x_n \\ y - C_b^{e(n)}(2,2) \times r_n - y_n \\ z - C_b^{e(n)}(3,2) \times r_n - z_n \end{bmatrix}.$$

The residual G is a matrix with m rows and one column, and m=3n. It is assumed that $g_1 = x - C_b^{e(i)}(1,2) \times r_1 - x_1$, $g_2 = y - C_b^{e(i)}(2,2) \times r_1 - y_1$, $g_3 = z - C_b^{e(i)}(3,2) \times r_1 - z_1$, . . . , $g_{m-2} = x - C_b^{e(i)}(1,2) \times r_n - x_n$, $g_{m-1} = y - C_b^{e(i)}(2,2) \times r_n - y_n$, $g_m = z - C_b^{e(i)}(3,2) \times r_n - z_n$. $G = [g_1, g_2, g_3, \ldots, g_{m-2}, g_{m-1}, g_m]^T$. In other words, G is a transposition matrix of $[g_1, g_2, g_3, \ldots, g_{m-2}, g_{m-1}, g_m]$.

The mobile phone 100 may calculate a modulus |G| of the residual G by using the following formula (13), where the modulus |G| of the residual G may be used as the calculation error of the spatial position information of the first home device:

$$|G| = \|AX - B\|_2 / n \qquad \text{Formula (13)}$$

$\|a\|_2$ represents a 2-norm of a vector a, and is a root of a sum of squares of elements in the vector a. In other words, $\|AX - B\|_2$ represents a 2-norm of a vector AX−B, and is a root of a sum of squares of elements in the vector AX−B.

Therefore, $$\|AX - B\|_2 = \left\| \begin{matrix} x - C_b^{e(1)}(1,2) \times r_1 - x_1 \\ y - C_b^{e(1)}(2,2) \times r_1 - y_1 \\ z - C_b^{e(1)}(3,2) \times r_1 - z_1 \\ \cdots \\ x - C_b^{e(n)}(1,2) \times r_n - x_n \\ y - C_b^{e(n)}(2,2) \times r_n - y_n \\ z - C_b^{e(n)}(3,2) \times r_n - z_n \end{matrix} \right\|_2 = \sqrt{\sum_{i=1}^{n} \left( x - C_b^{e(i)}(1,2) \times r_i - x_i \right)^2}.$$

It can be learned from the formula (13), namely, $|G| = \|AX - B\|_2 / n$, that, in a process in which the mobile phone 100 marks the position of the first home device, a larger quantity n of times that the mobile phone 100 points to the first home device indicates a smaller calculation error of the spatial position information of the first home device and higher calculation error of the spatial position information of the first home device. Therefore, in this embodiment of this application, a calculation error of a spatial position may be increased by increasing the quantity n of pointing times.

In addition, n indicates the quantity of times that the mobile phone 100 points to the first home device in the process in which the mobile phone 100 marks the position of the first home device. In the process in which the mobile phone 100 marks the position of the first home device, the mobile phone 100 points to the first home device in n orientations.

Specifically, after S1005', if the calculation error (namely, |G|) of the spatial position information of the first home device is less than the preset error threshold Th, it indicates that the calculation error of the spatial position is small, and the calculation error of the spatial position meets the precision requirement. Directional control on the first home device can be accurately implemented by using the spatial position information. Therefore, the mobile phone 100 may perform S1005 to store the spatial position information of the first home device.

In some embodiments, after obtaining the spatial position information of the first home device (for example, the smart speaker), the mobile phone 100 may perform S1005'. After S1005', if the calculation error of the spatial position information of the first home device is less than the preset error threshold, the mobile phone 100 may further send the third prompt information.

After S1005', if the calculation error (namely, |G|) of the spatial position information of the first home device is greater than or equal to the preset error threshold, it indicates that the calculation error of the spatial position is large, and the calculation error of the spatial position does not meet the precision requirement. It is difficult to accurately implement directional control on the first home device by using the spatial position information. Therefore, the mobile phone 100 may re-execute S1002 to S1004 to re-calculate the spatial position information of the first home device.

Figure 23:
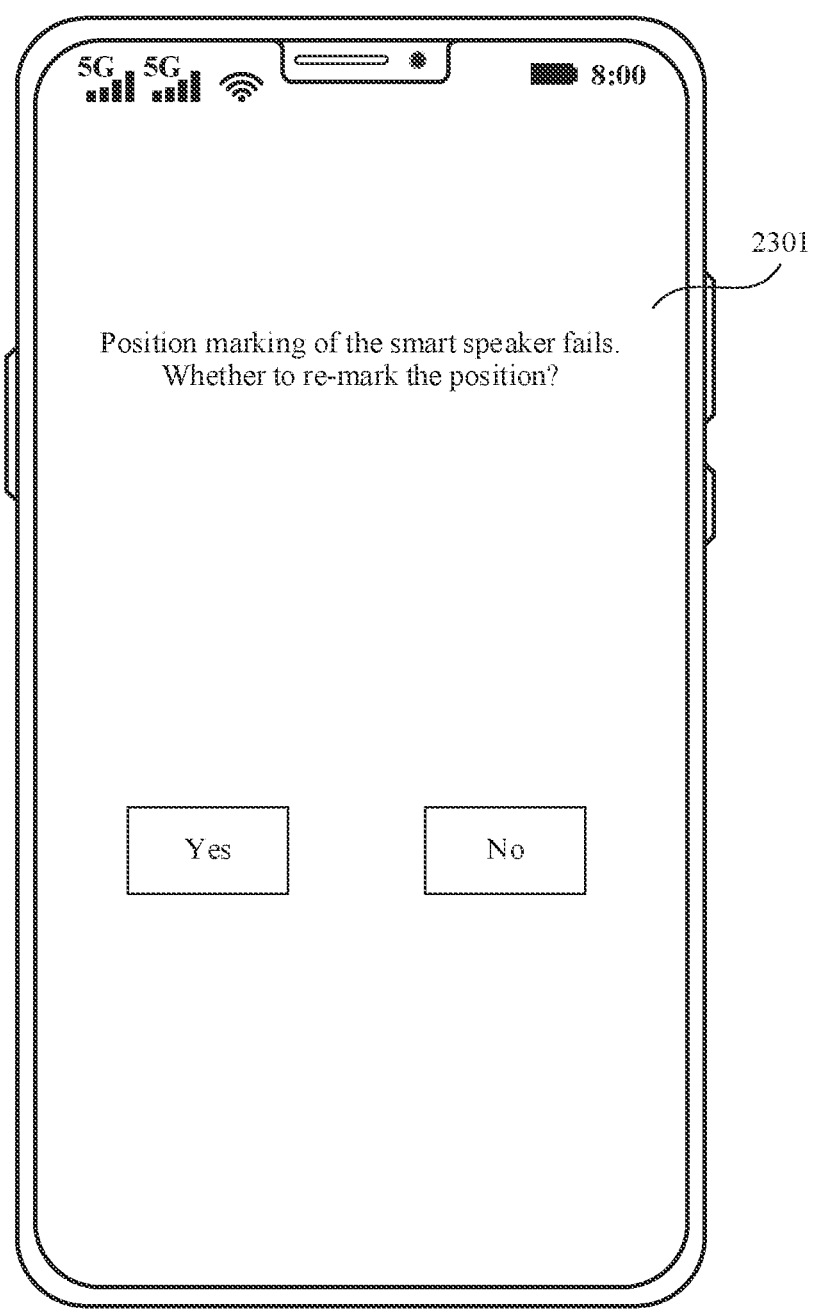
FIG. 23 is a schematic diagram of another display interface of an electronic device according to an embodiment of this application.

In some embodiments, after S1005', if the calculation error of the spatial position information of the first home device is greater than or equal to the preset error threshold, the mobile phone 100 may send fourth prompt information. The fourth prompt information is used to request the user to determine whether to re-mark the position of the first home device. For example, the mobile phone 100 may send fourth prompt information 2301 shown in FIG. 23, for example, "Position marking of the smart speaker fails. Whether to re-mark the position?" In response to a third operation performed by the user on the fourth prompt information, the mobile phone 100 may re-execute S1002 to S1004 to re-calculate the spatial position information of the first home device. The third operation is used to trigger the mobile phone 100 to perform position marking again. For example, the third operation may be a tap operation performed by the user on a "Yes" button shown in FIG. 23. In response to a fourth operation performed by the user on the fourth prompt information, the mobile phone 100 may display the home screen or the home page of the smart home app. The fourth operation is used to trigger the mobile phone 100 not to perform position marking again. For example, the fourth operation may be a tap operation performed by the user on an "No" button shown in FIG. 23.

In this embodiment of this application, before storing the spatial position information of the first home device, the mobile phone 100 may perform precision determining on the spatial position information, to determine whether the calculation precision of the spatial position information meets the precision requirement. The mobile phone 100 stores only spatial position information that meets the precision requirement. In this way, accuracy of directional control performed by the mobile phone 100 on the home device can be ensured, and user experience can be improved.

Figure 24:
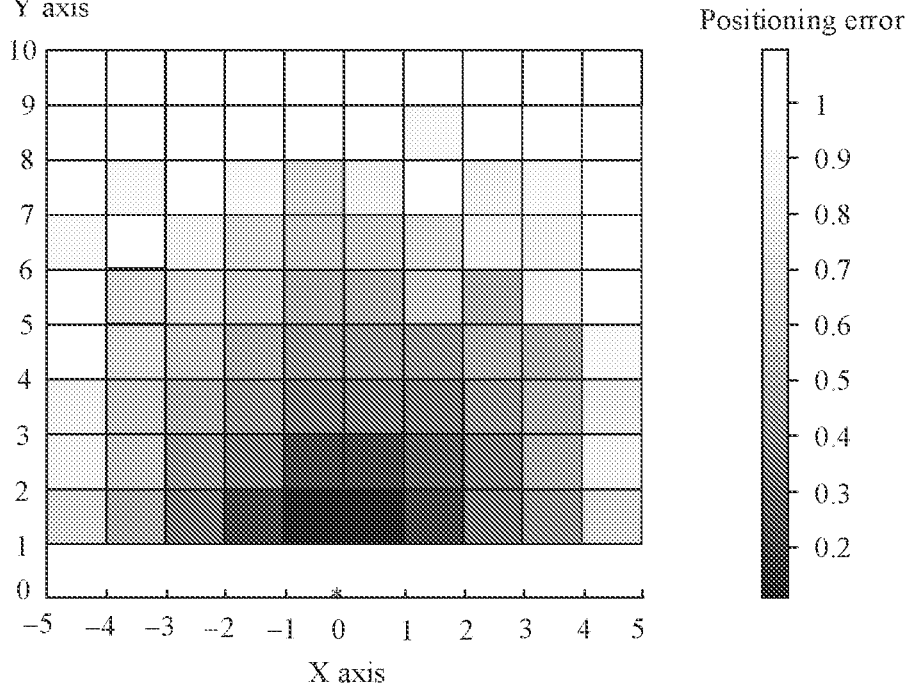
FIG. 24 is a schematic diagram of a simulation result according to an embodiment of this application.

In the following embodiments, effect of embodiments of this application is described through simulation. Specifically, three UWB base stations (for example, the base 0, the base 1, and the base 2) may be deployed in simulation space to construct a UWB positioning system (namely, a UWB coordinate system). It is specified that a measurement error of a distance between the mobile phone 100 and the UWB base station is 0.05 meter (m). As shown in FIG. 24, an asterisk indicates a position of the base 0. The position of the base 0 (namely, the asterisk) is used as an origin of the UWB coordinate system. A simulation range is X∈[−5,5] and Y∈[1:10], and a unit is a meter (m). FIG. 24 is a schematic diagram of UWB positioning accuracy obtained based on Monte Carlo simulation. In FIG. 24, different color depths represent different positioning accuracy (namely, the calculation precision). A deeper color indicates a smaller positioning error (namely, the calculation error) and higher positioning accuracy. It can be learned from FIG. 24 that, the closer to the UWB base station, the smaller the positioning error and the higher the positioning accuracy.

In addition, a calculation error of spatial attitude information (for example, a triaxial attitude) of the mobile phone in the simulation is set to 1°. In the simulation scenario, a to-be-marked home device (namely, the first home device, for example, the smart speaker) may be sequentially placed at a position (for example, a position 1) that is far away from the mobile phone 100 and a position (for example, a position 2) that is close to the mobile phone 100. At the position 1 shown in (a) in FIG. 25, a solution in the conventional technology and this solution are separately applied to mark the position of the first home device, so that a schematic diagram of changes of positioning errors of the two solutions shown in (b) in FIG. 25 may be obtained. At the position 2 shown in (a) in FIG. 26, the solution in the conventional technology and this solution are separately applied to mark the position of the first home device, so that a schematic diagram of changes of positioning errors of the two solutions shown in (b) in FIG. 26 may be obtained.

Figure 25:
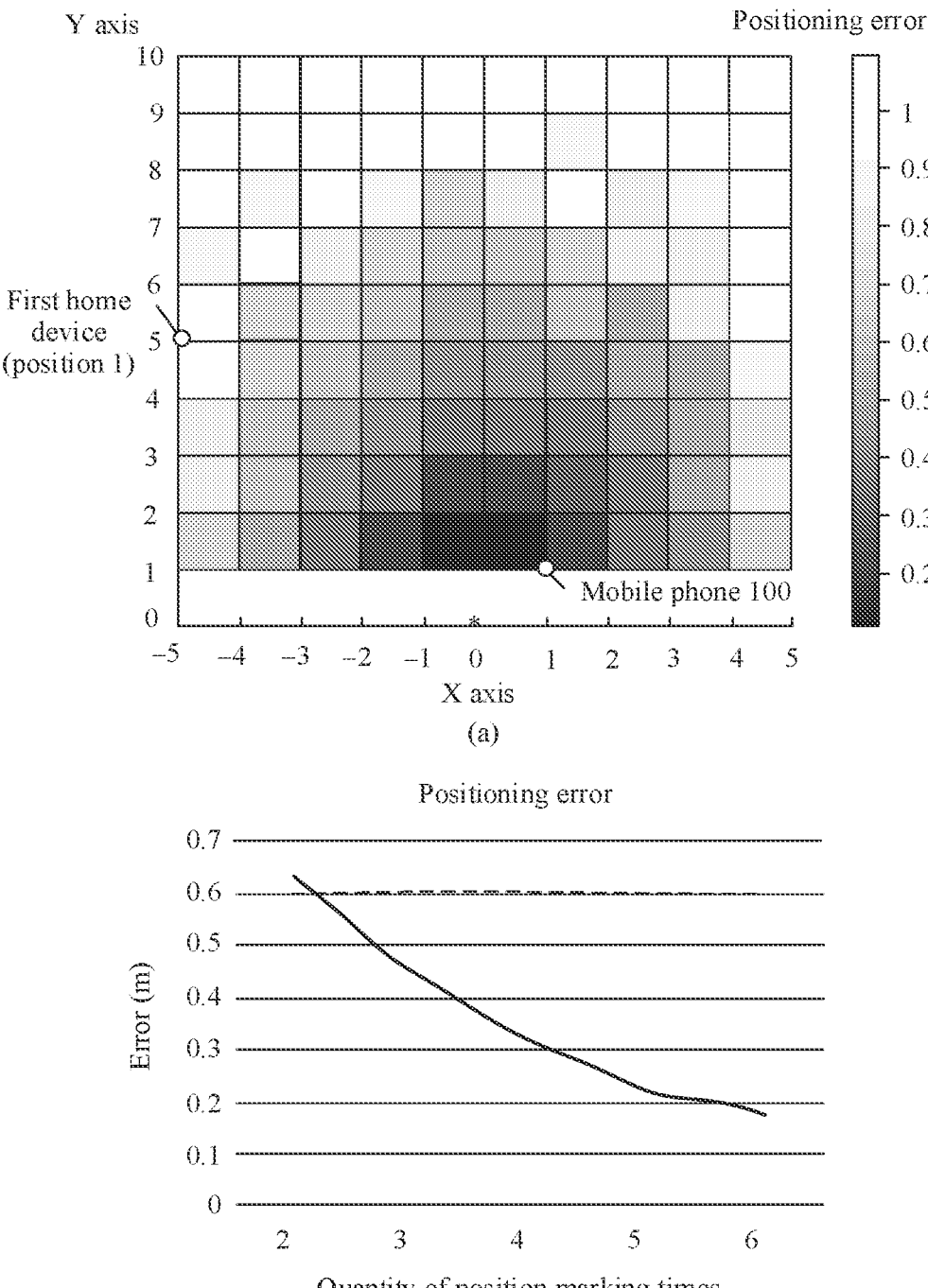
FIG. 25 is a schematic diagram of another simulation result according to an embodiment of this application.
Figure 26:
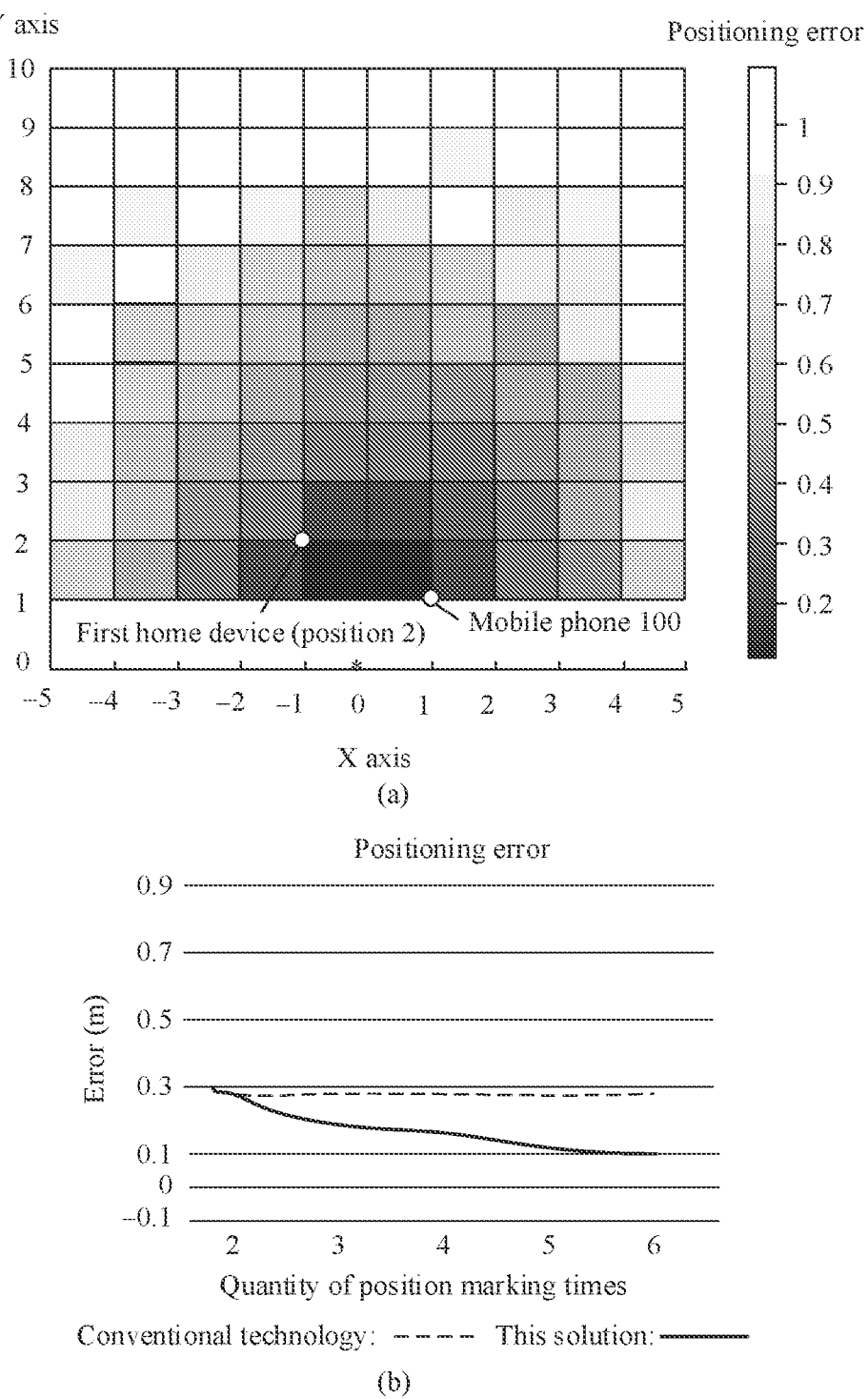
FIG. 26 is a schematic diagram of another simulation result according to an embodiment of this application.

It can be learned from (b) in FIG. 25 and (b) in FIG. 26 that when position marking is performed on the home device twice by using this solution, positioning accuracy of the solution is the same as positioning accuracy of the conventional solution. However, as a quantity of position marking times increases, the positioning accuracy of this solution is clearly better than that of the conventional solution. In addition, it can be learned, by comparing (b) in FIG. 25 with (b) in FIG. 26, that, when the position of the home device is marked by using this solution, a distance between the home device and the mobile phone has smaller impact on the positioning accuracy.

Some other embodiments of this application provide an electronic device. The electronic device may include the touchscreen, a memory, and one or more processors. The touchscreen, the memory, and the processor are coupled. The memory is configured to store computer program code. The computer program code includes computer instructions. When the processor executes the computer instructions, the electronic device may perform the functions or steps performed by the mobile phone in the foregoing method embodiment. For a structure of the electronic device, refer to the structure of the electronic device 100 shown in FIG. 3.

Some other embodiments of this application provide a display apparatus. The apparatus may be applied to an electronic device including the touchscreen. The apparatus is configured to perform the functions or steps performed by the mobile phone in the foregoing method embodiment.

Figure 27:
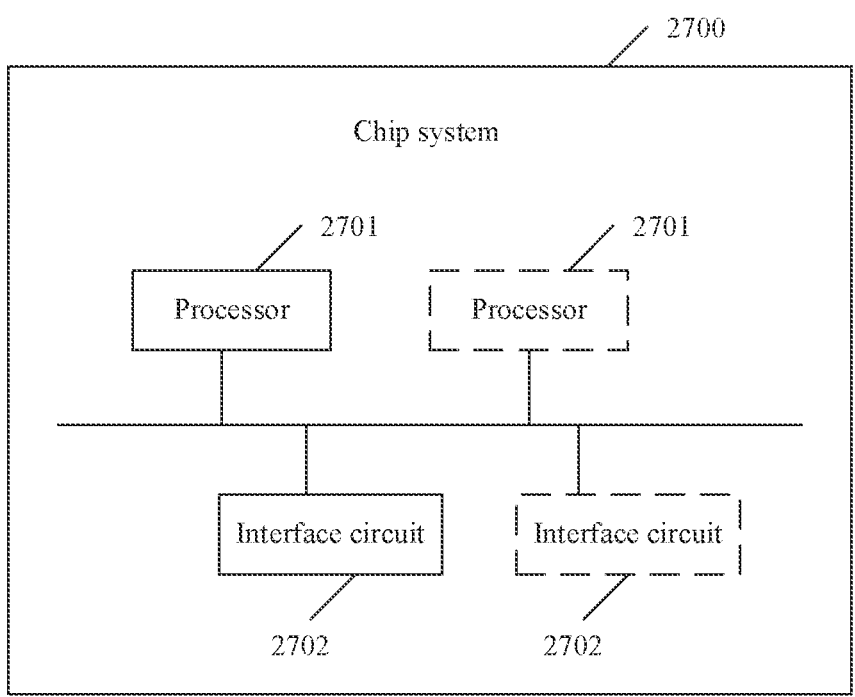
FIG. 27 is a schematic diagram of a structure of a chip system according to an embodiment of this application.

An embodiment of this application further provides a chip system. As shown in FIG. 27, the chip system 2700 includes at least one processor 2701 and at least one interface circuit 2702. The processor 2701 and the interface circuit 2702 may be interconnected by using a line. For example, the interface circuit 2702 may be configured to receive a signal from another apparatus (for example, a memory of an electronic device). For another example, the interface circuit 2702 may be configured to send a signal to another apparatus (for example, the processor 2701). For example, the interface circuit 2702 may read instructions stored in the memory, and send the instructions to the processor 2701. When the instructions are executed by the processor 2701, the electronic device is enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of this application further provides a computer program product. When the computer program product is run on a computer, the computer is enabled to perform functions or steps performed by a mobile phone in the foregoing method embodiments.

The foregoing descriptions about implementations allow a person skilled in the art to clearly understand that, for the purpose of convenient and brief description, division of the functional modules is used as an example for illustration. In actual application, the functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on an actual requirement to achieve an objective of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by an electronic device, wherein the method comprises:

receiving a first operation of a user to trigger the electronic device to initiate marking a position of a first home device in a plurality of home devices;

obtaining, in response to the first operation and using an ultra-wideband (UWB) chip, n measurements of spatial position-attitude information of the electronic device when the electronic device is positioned towards the first home device in a respective orientation from n orientations, wherein the spatial position-attitude information comprises spatial position information and spatial attitude information, and wherein $n \geq 2$ and n is an integer; and calculating first spatial position information of the first home device based on the n measurements of the spatial position-attitude information in order to mark the position of the first home device.

2. The method according to claim 1, wherein receiving the first operation comprises receiving the first operation on a first interface, wherein the first interface is a device management interface of a smart home application of the electronic device, wherein the home devices are bound to the smart home application, wherein the device management interface comprises icons of the home devices, and wherein the first operation is a preset operation on the first home device.

3. The method according to claim 1, further comprising sending, in response to the first operation, first prompt information to prompt the user to control the electronic device to be positioned towards the first home device.

4. The method according to claim 3, wherein after sending the first prompt information, the method further comprises:

obtaining the spatial position-attitude information in a first orientation k from the n orientations; and sending second prompt information to prompt the user to control the electronic device to move from the first orientation k to a second orientation k+1 and be positioned towards the first home device in the second orientation k+1, wherein k has a value in a set of values $\{1, 2, \ldots, n-1\}$.

5. The method according to claim 1, wherein after calculating the first spatial position information, the method further comprises sending prompt information to prompt the user that position marking of the first home device is completed and that the electronic device can be operated to directionally control the first home device.

6. The method according to claim 1, wherein obtaining the n measurements of the spatial position-attitude information comprises obtaining, in response to a second operation, first spatial position-attitude information i of the electronic device when the electronic device is positioned towards the first home device in a first orientation i from the n orientations, wherein i has a value in a set of values $\{1, 2 \ldots, n\}$, wherein the second operation is a tap operation on a preset button in the electronic device or a preset control in the first prompt information when the user controls the electronic device to be positioned towards the first home device in the first orientation i, wherein the preset button is to trigger the electronic device to obtain the spatial position-attitude information, and wherein the preset control is to trigger the electronic device to obtain the spatial position-attitude information.

7. The method according to claim 1, further comprising:

interacting, when the electronic device is positioned towards the first home device in a first orientation i from the n orientations, with m UWB base stations using the UWB chip;

obtaining a distance between the electronic device and each of the m UWB base stations;

calculating second spatial position information i of the electronic device based on the obtained distance, wherein i has a value in a set of values $\{1, 2, \ldots, n\}$, wherein $m \geq 3$ and is an integer, and wherein the m UWB base stations are part of at least one home device comprising a first UWB chip; and obtaining, using the UWB chip and an inertial measurement units (IMU) chip, first spatial attitude information i of the electronic device when the electronic device is positioned towards the first home device in the first orientation i.

8. The method according to claim 7, wherein the second spatial position information i comprises second coordinates $(x_i, y_i, z_i)$ of the electronic device in a UWB coordinate system of the m UWB base stations, wherein the first spatial attitude information i comprises a pitch angle $\varphi_i$, a yaw angle $\phi_i$, and a roll angle $\theta_i$ of a carrier coordinate system of the electronic device relative to the UWB coordinate system, and wherein the first spatial position information comprises first coordinates (x, y, z) of the first home device in the UWB coordinate system.

9. The method according to claim 8, further comprising:

obtaining a preset rotation matrix when the electronic device transforms from a spatial attitude corresponding to the pitch angle $\varphi_i$, the yaw angle $\phi_i$, and the roll angle $\theta_i$ to a preset initial attitude, wherein the preset rotation matrix is a rotation matrix and converts a first coordinate parameter in the carrier coordinate system into a second coordinate parameter in the UWB coordinate system, and wherein the preset initial attitude is an attitude of the electronic device when first three axes of the carrier coordinate system are respectively parallel to second three axes of the UWB coordinate system; and further calculating the first spatial position information comprising the first coordinates (x, y, z) using the preset rotation matrix based on the second coordinates $(x_i, y_i, z_i)$, the pitch angle $\varphi_i$, the yaw angle $\phi_i$, and the roll angle $\theta_i$.

10. An electronic device, wherein the electronic device comprises:

an ultra-wideband (UWB) chip;

a memory configured to store instructions; and one or more processors coupled to the memory and the UWB chip and configured to execute the instructions to cause the electronic device to:

receive a first operation of a user to trigger the electronic device to initiate marking a position of a first home device in a plurality of home devices;

obtain, in response to the first operation and using the UWB chip, n measurements of spatial position-attitude information of the electronic device when the electronic device is positioned towards the first home device in a respective orientation from n orientations, wherein the spatial position-attitude information comprises spatial position information and spatial attitude information, and wherein $n \geq 2$ and n is an integer; and calculate first spatial position information of the first home device based on the n measurements of the spatial position-attitude information in order to mark the position of the first home device.

11. The electronic device according to claim 10, wherein the one or more processors are further configured to execute the instructions to cause the electronic device to:

further receive the first operation of the user on a first interface, wherein the first interface is a device management interface of a smart home application of the electronic device and comprises icons of the home devices that are bound to the smart home application, and the first operation is a preset operation on the first home device; or wherein the first interface is a control interface of the first home device bound to a smart home application of the electronic device and comprises a preset function item, to trigger the electronic device to initiate marking the position of the first home device, and the first operation is a tap operation on the preset function item.

12. The electronic device according to claim 10, wherein the one or more processors are further configured to execute the instructions to cause the electronic device to send first prompt information in response to the first operation, wherein the first prompt information is to prompt the user to control the electronic device to be positioned towards the first home device.

13. The electronic device according to claim 10, wherein the one or more processors are further configured to execute the instructions to cause the electronic device to:

obtain the spatial position-attitude information in a first orientation k from the n orientations; and end second prompt information to prompt the user to control the electronic device to move from the first orientation k to a second orientation k+1 and be positioned towards the first home device in the second orientation k+1, wherein k has a value in a set of values $\{1, 2, \ldots, n-1\}$.

14. The electronic device according to claim 10, wherein the one or more processors are further configured to execute the instructions to cause the electronic device to:

send, after calculating the first spatial position information, prompt information to prompt the user that position marking of the first home device is completed and that the electronic device can be operated to directionally control the first home device.

15. The electronic device according to claim 10, wherein the one or more processors are further configured to execute the instructions to cause the electronic device to obtain the n measurements of the spatial position-attitude information by obtaining, in response to a second operation, first spatial position-attitude information i of the electronic device when the electronic device is positioned towards the first home device in a first orientation i from the n orientations, wherein i has a value in a set of values $\{1, 2 \ldots, n\}$, wherein the second operation is a tap operation on a preset button in the electronic device or a preset control in the first prompt information when the user controls the electronic device to be positioned towards the first home device in the first orientation i, wherein the preset button is to trigger the electronic device to obtain the spatial position-attitude information, and wherein the preset control is to trigger the electronic device to obtain the spatial position-attitude information.

16. The electronic device according to claim 10, wherein the electronic device further comprises an inertial measurement unit (IMU chip), and wherein the one or more processors are further configured to execute the instructions to cause the electronic device to:

interact, when the electronic device is positioned towards the first home device in a first orientation i from the n orientations, with m UWB base stations using the UWB chip;

obtain a distance between the electronic device and each of the m UWB base stations;

calculate second spatial position information i of the electronic device based on the obtained distance, wherein i has a value in a set of values $\{1, 2, \ldots, n\}$, wherein $m \geq 3$ and m is an integer, and wherein the m UWB base stations are part of at least one home device comprising a first UWB chip; and obtain, using the UWB chip and the IMU chip, first spatial attitude information i of the electronic device when the electronic device is positioned towards the first home device in the first orientation i.

17. The electronic device according to claim 16, wherein the second spatial position information i comprises second coordinates $(x_i, y_i, z_i)$ of the electronic device in a UWB coordinate system of the m UWB base stations, wherein the first spatial attitude information i of the electronic device in the orientation i comprises a pitch angle $\varphi_i$, a yaw angle $\phi_i$, and a roll angle $\theta_i$ of a carrier coordinate system of the electronic device relative to the UWB coordinate system, and wherein the first spatial position information comprises first coordinates (x, y, z) of the first home device in the UWB coordinate system.

18. The electronic device according to claim 17, wherein the one or more processors are further configured to execute the instructions to cause the electronic device to:

obtain a preset rotation matrix when the electronic device transforms from a spatial attitude corresponding to the pitch angle $\varphi_i$, the yaw angle $\phi_i$, and the roll angle $\theta_i$ to a preset initial attitude, wherein the preset rotation matrix is a rotation matrix and converts a first coordinate parameter in the carrier coordinate system into a second coordinate parameter in the UWB coordinate system, and wherein the preset initial attitude is an attitude of the electronic device when first three axes of the carrier coordinate system are respectively parallel to second three axes of the UWB coordinate system; and further calculate the first spatial position information comprising the first coordinates (x, y, z) using the preset rotation matrix based on the second coordinates $(x_i, y_i, z_i)$, the pitch angle $\varphi_i$, the yaw angle $\phi_i$, and the roll angle $\theta_i$.

19. A computer program product comprising computer-executable instructions that are stored on a non-transitory computer-readable medium and that, when executed by a processor, cause an electronic device to:

receive a first operation of a user to trigger the electronic device to initiate marking a position of a first home device in a plurality of home devices;

obtain, in response to the first operation and using an ultra-wideband (UWB) chip, n measurements of spatial position-attitude information of the electronic device when the electronic device is positioned towards the first home device in a respective orientation from n orientations, wherein the spatial position-attitude information comprises spatial position information and spatial attitude information, and wherein $n \geq 2$ and n is an integer; and calculate first spatial position information of the first home device based on the n measurements of the spatial position-attitude information in order to mark the position of the first home device.

20. The computer program product according to claim 19, wherein receiving the first operation comprises receiving the first operation on a first interface, wherein the first interface is a control interface of the first home device bound to a smart home application of the electronic device, wherein the control interface comprises a preset function item to trigger the electronic device to initiate marking the position of the first home device, and wherein the first operation is a tap operation performed on the preset function item.

\* \* \* \* \*